US009779290B2

United States Patent
Endo et al.

(10) Patent No.: US 9,779,290 B2
(45) Date of Patent: Oct. 3, 2017

(54) DETECTING APPARATUS, DETECTING METHOD AND COMPUTER READABLE RECORDING MEDIUM RECORDING PROGRAM FOR DETECTING STATE IN PREDETERMINED AREA WITHIN IMAGES

(71) Applicant: CASIO COMPUTER CO., LTD., Shibuya-ku, Tokyo (JP)

(72) Inventors: Masayuki Endo, Tokorozawa (JP); Tsutomu Shimono, Kunitachi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/804,036

(22) Filed: Jul. 20, 2015

(65) Prior Publication Data

US 2016/0044222 A1 Feb. 11, 2016

(30) Foreign Application Priority Data

Aug. 8, 2014 (JP) .................................. 2014-162003
Nov. 26, 2014 (JP) .................................. 2014-238570

(51) Int. Cl.
*H04N 5/232* (2006.01)
*G06K 9/00* (2006.01)

(52) U.S. Cl.
CPC ......... *G06K 9/00362* (2013.01); *H04N 5/232* (2013.01); *H04N 5/23212* (2013.01); *H04N 5/23219* (2013.01); *H04N 5/23293* (2013.01); *G06K 9/00228* (2013.01); *G06K 9/00389* (2013.01); *G06K 9/00664* (2013.01); *G06K 2209/21* (2013.01)

(58) Field of Classification Search
None
See application file for complete search history.

(56) References Cited

U.S. PATENT DOCUMENTS

| 2005/0096084 A1* | 5/2005 | Pohja ................ G06F 17/30038 455/556.1 |
| 2012/0162474 A1* | 6/2012 | Sukegawa ............. H04L 9/3215 348/231.99 |
| 2013/0088605 A1* | 4/2013 | Quarfordt ........... H04L 67/1044 348/207.1 |

FOREIGN PATENT DOCUMENTS

| JP | 06028399 B2 | 4/1994 |
| JP | 06153017 A | 5/1994 |
| JP | 2005333420 A | 12/2005 |

(Continued)

OTHER PUBLICATIONS

Japanese Office Action (and English translation thereof) dated Jan. 5, 2016, issued in counterpart Japanese Application No. 2014-238570.

(Continued)

*Primary Examiner* — Stephen Coleman
(74) *Attorney, Agent, or Firm* — Holtz, Holtz & Volek PC

(57) ABSTRACT

An imaging apparatus of an embodiment of the present invention includes a detecting unit 4*d* for detecting a state in a detection area T within an image displayed in a display panel 8*a*, an identifying unit 4*b* for identifying a subject from the image, an acquiring unit 4*c* for acquiring information relating to a predetermined subject in the case that the identifying unit 4*b* identifies the predetermined subject outside the detection area T, and a control unit (the detecting unit 4*d*) for controlling detection of the state in the detection area T based on the information relating to the predetermined subject acquired by the acquiring unit 4*c*.

18 Claims, 16 Drawing Sheets

(56) References Cited

FOREIGN PATENT DOCUMENTS

| | | | |
|---|---|---|---|
| JP | 2008283502 | A | 11/2008 |
| JP | 2010009558 | A | 1/2010 |
| JP | 2010193423 | A | 9/2010 |
| JP | 2011097502 | A | 5/2011 |
| JP | 2011243031 | A | 12/2011 |
| JP | 2012134872 | A | 7/2012 |
| JP | 2013183185 | A | 9/2013 |

OTHER PUBLICATIONS

Japanese Office Action (and English translation thereof) dated Apr. 26, 2016, issued in counterpart Japanese Application No. 2014-238570.

* cited by examiner

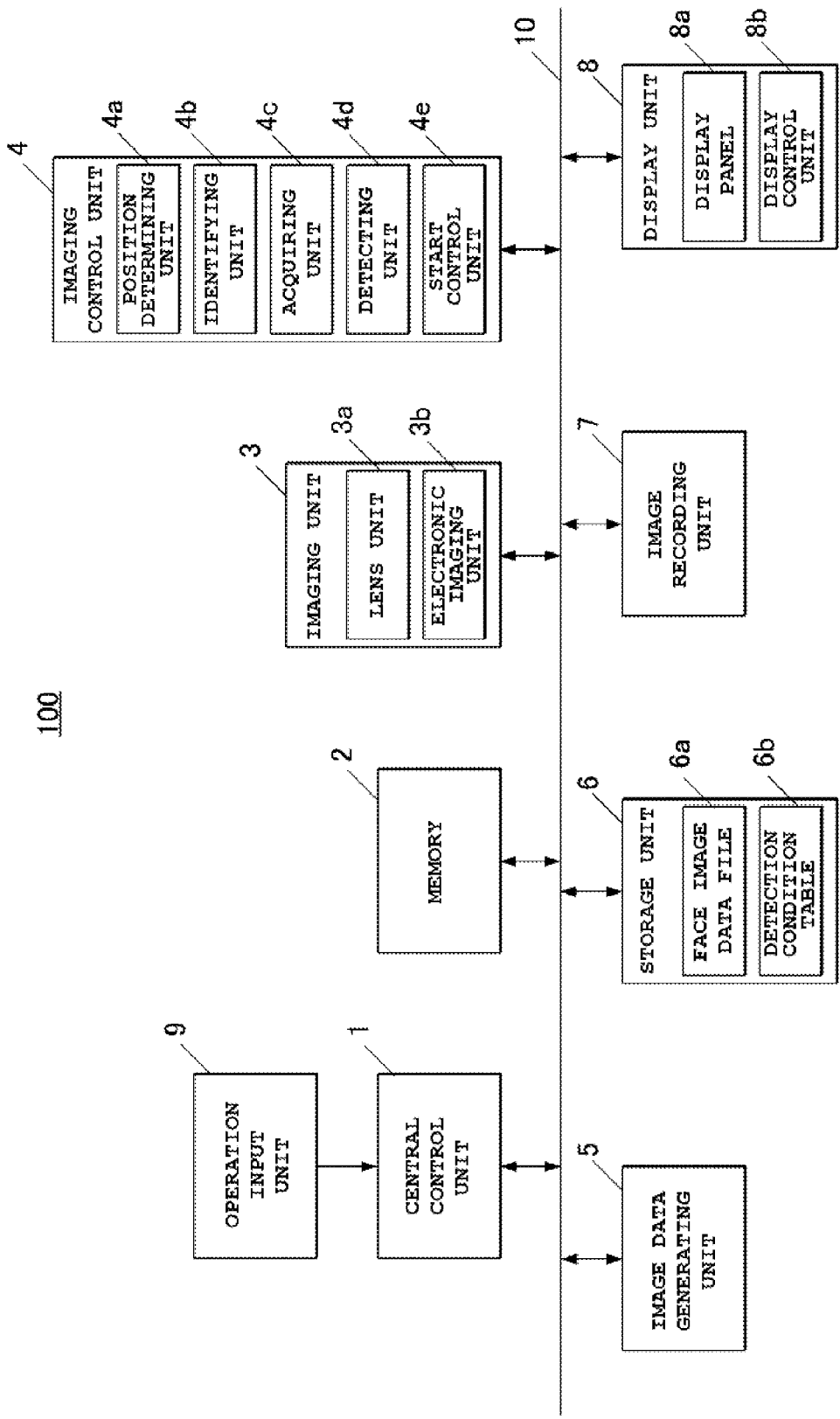

FIG. 3

| KIND | TERMS OF CONDITION | |
|---|---|---|
| DETECTION CONDITION 1 | SUBJECT FOCUS DISTANCE[m]±s[m] | |
| DETECTION CONDITION 2 | RGB VALUE OF SKIN COLOR OF FACE ±t OR HUE VALUE OF SKIN COLOR OF FACE ±u[°] | |
| DETECTION CONDITION 3 | SIZE OF HAND[pixels]±v[pixels] | |
| DETECTION CONDITION 4 | RGB VALUE OF COLOR OF CLOTHES ±p OR HUE VALUE OF COLOR OF CLOTHES ±q[°] | |
| DETECTION CONDITION A | Person a | UP→DOWN |
| | Person b | DOWN→UP |
| | Person c | UP→DOWN→UP |
| | Person d | DOWN→UP→DOWN |
| | ⋮ | ⋮ |

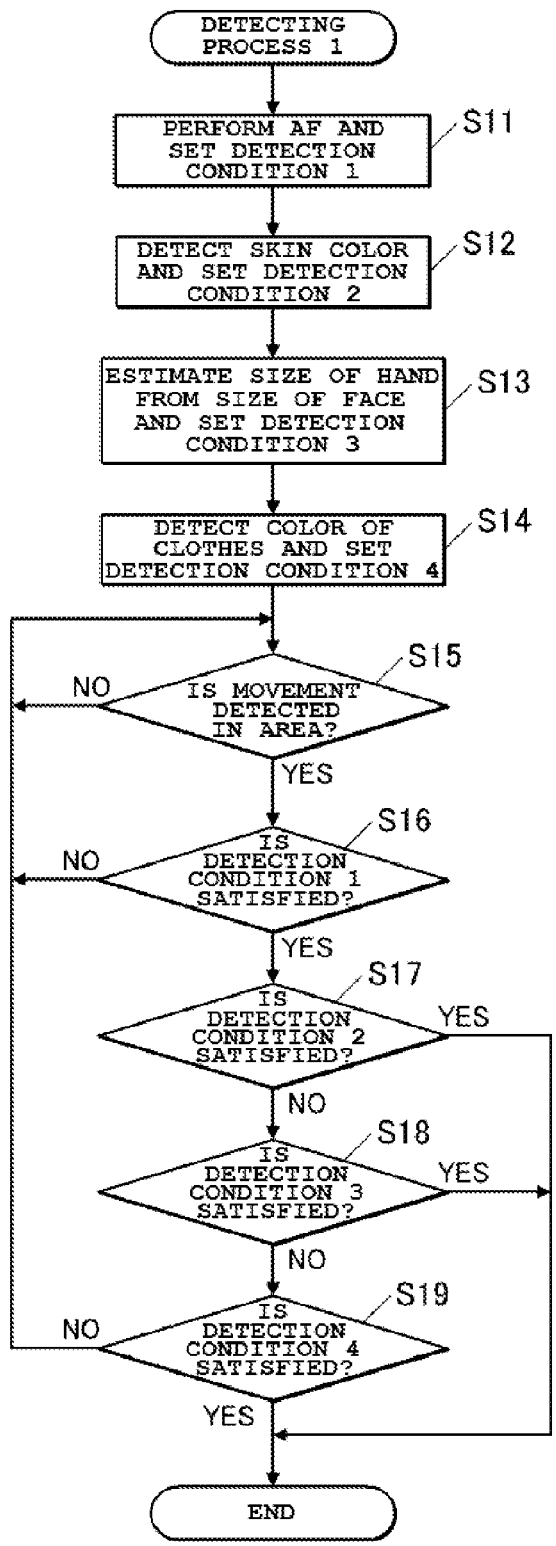

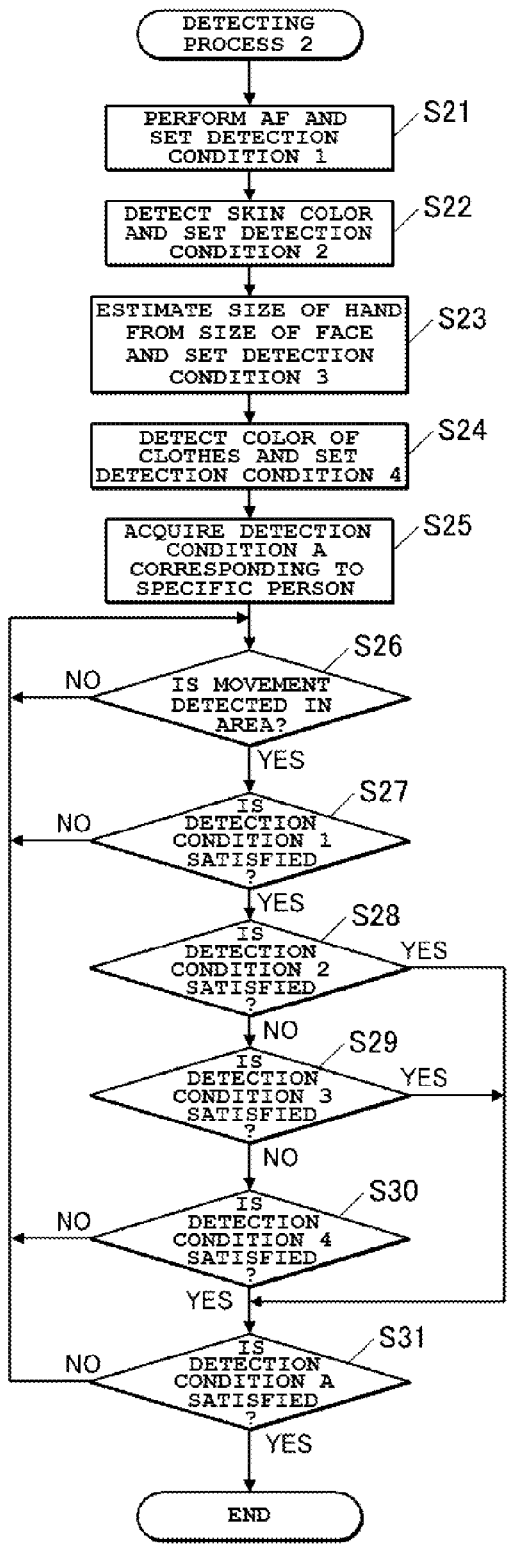

DETECTING APPARATUS, DETECTING METHOD AND COMPUTER READABLE RECORDING MEDIUM RECORDING PROGRAM FOR DETECTING STATE IN PREDETERMINED AREA WITHIN IMAGES

CROSS-REFERENCE TO RELATED APPLICATIONS

This application is based upon and claims the benefit of priority under 35 USC 119 of Japanese Patent Application No. 2014-162003 filed on Aug. 8, 2014 and Japanese Patent Application No. 2014-238570 filed on Nov. 26, 2014, the entire disclosure of which is incorporated herein by reference in its entirety for all purposes.

BACKGROUND OF THE INVENTION

1. Field of the Invention

The present invention relates to a detecting apparatus, a detecting method, and a computer readable recording medium for recording a program thereon.

2. Description of the Related Art

Conventionally, there has been disclosed an automatic shooting function provided in an imaging apparatus such as a digital camera for detecting movements of a subject in a specified area within the screen of the imaging apparatus and automatically releasing the shutter (hereinafter, referred to as a "motion shutter"), for example, in Japanese Patent Application Laid-Open Publication No. 2005-333420 published on Dec. 2, 2005.

A motion shutter is generally realized by detecting an intentional gesture of a person who is a subject (for example, a motion of a hand) in a specified area. However, the motion shutter disclosed in the above mentioned patent publication has a problem that, in the case that an image of a person other than the subject or a tree branch swaying in the wind is taken and the person or the tree branch appears in the specified area, a movement of the person or the tree branch cannot be distinguished from an intentional gesture of the subject thereby resulting in a detection error.

SUMMARY OF THE INVENTION

The present invention was made in light of the problem mentioned above, and an object of the present invention is to detect a state of a subject with reduced detection errors.

In order to achieve the above object, an embodiment of the present invention provides a detecting apparatus including a detecting section configured to detect a state in a predetermined area within an image, an identifying section configured to identify a subject from the image, an acquiring section configured to acquire information relating to a predetermined subject in the case that the identifying section identifies the predetermined subject outside the predetermined area, and a control section configured to control detection of the state in the predetermined area by the detecting section based on the information relating to the predetermined subject acquired by the acquiring section.

In order to achieve the above object, an embodiment of the present invention provides a detecting apparatus including a detecting section configured to detect a change in a state in a predetermined area within an image, an acquiring section configured to acquire focus distance information relating to a focus distance in the case that the detecting section detects the change in the state in the predetermined area, the focus distance being a distance to a location in which the change in the state is detected, and a determining section configured to determine whether or not the change in the state detected by the detecting section is significant based on the focus distance information acquired by the acquiring section.

In order to achieve the above object, an embodiment of the present invention provides a detecting method including detecting a state in a predetermined area within an image, identifying a subject from the image, acquiring information relating to a predetermined subject in the case that the predetermined subject is identified outside the predetermined area, and controlling detection of the state in the predetermined area based on the information relating to the predetermined subject.

In order to achieve the above object, an embodiment of the present invention provides a detecting method including detecting a change in a state in a predetermined area within an image, acquiring focus distance information relating to a focus distance in the case that the change in the state is detected in the predetermined area, the focus distance being a distance to a location in which the change in the state is detected, and determining whether or not the change in the state is significant based on the acquired focus distance information.

In order to achieve the above object, an embodiment of the present invention provides a non-transitory computer-readable recording medium for recording a program readable by a computer. The program controls the computer to execute a detecting function of detecting a change in a state in a predetermined area within an image, an acquiring function of acquiring focus distance information relating to a focus distance in the case that the change in the state in the predetermined area is detected by the detecting function, the focus distance being a distance to a location in which the change in the state is detected, and a determining function of determining whether or not the change in the state detected by the detecting function is significant based on the focus distance information acquired by the acquiring function.

In order to achieve the above object, an embodiment of the present invention provides a non-transitory computer-readable recording medium for recording a program readable by a computer. The program controlling the computer to execute a detecting function of detecting a state in a predetermined area within an image, an identifying function of identifying a subject from the image, an acquiring function of acquiring information relating to a predetermined subject in the case that the predetermined subject is identified by the identifying function outside the predetermined area, and a control function of controlling detection of the state in the predetermined area by the detecting function based on the information relating to the predetermined subject acquired by the acquiring function.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings.

Here:

FIG. 1 is a block diagram showing an outlined configuration of an imaging apparatus according to a first embodiment to which the present invention is applied.

FIG. 3 shows an example of a detection condition table of the imaging apparatus of FIG. 1.

FIG. 5 is an exemplary flow chart for showing steps of a detecting process 1 of the motion shutter process of FIG. 4.

FIG. 6 is an exemplary flow chart for showing steps of a detecting process 2 of the motion shutter process of FIG. 4.

DETAILED DESCRIPTION OF THE PREFERRED EMBODIMENT

Hereinafter, embodiments of the present invention will be described with reference to the accompanying drawings. The scope of the invention is not intended to be limited to the illustrated examples.

First Embodiment

Figure 2A:
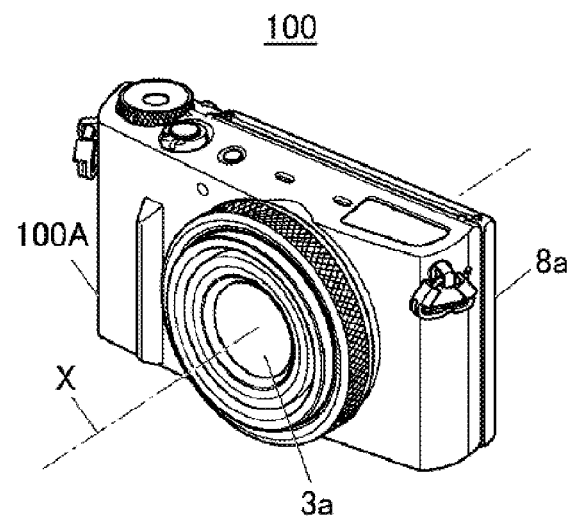
FIGS. 2A and 2B are perspective views depicting the imaging apparatus of FIG. 1 schematically.

FIG. 1 is a block diagram showing an outlined configuration of an imaging apparatus 100 according to a first embodiment to which the present invention is applied. FIG. 2A is a perspective view schematically depicting the imaging apparatus 100 of FIG. 1 and FIG. 2B is a perspective view schematically depicting a state in which a display panel 8a of the imaging apparatus 100 is rotated by 180°.

As shown in FIG. 1, the imaging apparatus 100 of the present embodiment includes a central control unit 1, a memory 2, an imaging unit 3, an imaging control unit 4, an image data generating unit 5, a storage unit 6, an image recording unit 7, a display unit 8, and an operation input unit 9.

Further, the central control unit 1, the memory 2, the imaging unit 3, the imaging control unit 4, the image data generating unit 5, the storage unit 6, the image recording unit 7, and the display unit 8 are connected via a bus line 10 with each other.

Figure 2B:
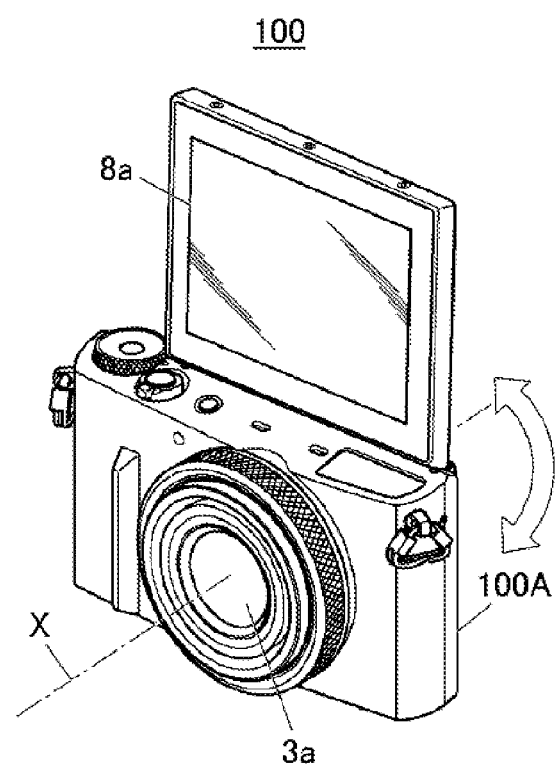

As shown in FIGS. 2A and 2B, the display panel 8a of the display unit 8 is connected through a rotation mechanism (for example, a hinge mechanism) to the main body 100A of the imaging apparatus 100 which includes the imaging unit 3 (in particular, a lens unit 3a which will be described later). More specifically, the display panel 8a is pivotally supported to the main body 100A so that it can rotate by about 180° around an axis lying approximately at right angles to an optical axis of the X direction (for example, an axis of the horizontal direction). Thus, by rotating the display panel 8a by about 180° with respect to the main body 100A, the display panel 8a can be placed facing a subject like an exposed face of the lens unit 3a so that the display direction of the display panel 8a is almost the same as the imaging direction of the imaging unit 3 (see FIG. 2B). When the display panel 8a looks the same direction as the exposed face of the lens unit 3a, a user can visually recognize an image including oneself displayed in the display panel 8a to take a self-portrait (a so-called selfie).

Alternatively, the display panel 8a can be pivotally supported to the main body 100A so that it can rotate by about 180° around an axis of the vertical direction lying approximately at right angles to an optical axis of the X direction, for example. In this case, when the display panel 8a looks the same direction as the exposed face of the lens unit 3a, the user can take a self-portrait.

The central control unit 1 controls each unit of the imaging apparatus 100. More specifically, the central control unit 1 includes a CPU (Central Processing Unit), a RAM (Random Access Memory) and a ROM (Read Only Memory) which are not shown in the drawings, and performs various control operations according to various programs for the imaging apparatus 100 (which are not shown in the drawings).

The memory 2 includes, for example, a DRAM (Dynamic Random Access Memory) and temporarily stores data processed by each unit such as the central control unit 1 or the imaging control unit 4.

The imaging unit (an imaging means) 3 captures an image of a subject. More specifically, the imaging unit 3 includes the lens unit 3a and an electronic imaging unit 3b.

The lens unit 3a includes a plurality of lenses such as a zoom lens, a focus lens, or the like.

The electronic imaging unit 3b includes an image sensor such as a CCD (Charge Coupled Device), a CMOS (Complementary Metal-oxide Semiconductor), or the like, and converts an optical image which has passed various lenses of the lens unit 3a into a two-dimensional image signal.

The imaging unit 3 may include a diaphragm (not shown in the drawings) for regulating the amount of light that passes through the lens unit 3a.

The imaging control unit 4 controls imaging of a subject by the imaging unit 3.

The imaging control unit 4 includes, for example, a timing generator, a driver, and the like (not shown in the drawings). Further, the imaging control unit 4 drives scanning of the electronic imaging unit 3b by the timing generator and the driver to convert an optical image into a two-dimensional image signal every predetermined period by the electronic imaging unit 3b, reads out a frame image for each screen from an imaging region of the electronic imaging unit 3b and outputs the frame image to the image data generating unit 5. Further, the imaging control unit 4 performs control for adjusting conditions of capturing an image of the subject such as AF (auto-focus), AF (auto-exposure), AWB (auto white balance), and the like.

The imaging control unit 4 further includes a position determining unit 4a, an identifying unit 4b, an acquiring unit 4c, a detecting unit 4d, and a start control unit 4e.

Each of the units of the imaging control unit 4 may include predetermined logic circuits which is an example and not intended to limit the scope of the invention.

The position determining unit 4a determines a position of the imaging apparatus 100.

In other words, the position determining unit 4a determines whether or not the imaging apparatus 100 is in a position where a subject can visually recognize an image of oneself captured by the imaging unit 3 and displayed by the display unit 8 (a so-called self-portrait position).

More specifically, the position determining unit 4a determines whether or not the imaging direction of the imaging unit 3 (a direction in which the lens unit 3a is exposed) and the display direction of the display panel 8a are almost the same when an image of the subject is captured by the imaging unit 3. For example, the position determining unit 4a determines whether or not the imaging direction of the imaging unit 3 and the display direction of the display panel 8a are almost the same based on a detection signal of a switch for mechanically detecting rotation of the display panel 8a of about 180° with respect to the main body 100A (not shown in the drawings) or a sensor for detecting an inclination of the display panel 8a with respect to the gravity vector (for example, an acceleration sensor not shown in the drawings).

In the case that the position determining unit 4a determines whether or not the imaging direction of the imaging unit 3 and the display direction of the display panel 8a are almost the same, the imaging apparatus 100 is regarded as being in a position in which the subject can visually recognize an image of oneself captured by the imaging unit 3 and displayed by the display unit 8.

The identifying unit (an identifying means) 4b identifies a subject from a live view image L (see FIG. 7A) displayed in the display panel 8a.

According to the present embodiment, the identifying unit 4b executes predetermined face detection processing to detect a face area F (see FIG. 7A) in which a human face appears in each of live view images L sequentially displayed. In the case that a face area F is detected, it is regarded that the identifying unit 4b identifies the subject as a human being. Further, in the case of detecting the face area F, the identifying unit 4b compares image data of the face area F with face image data relating to a face of a specific person stored in a face image data file 6a (which will be described later) and determines whether or not the subject identified as a human being is the specific person. In the case that the image data of the face area F accords with the face image data relating to the face of the specific person, the identifying unit 4b identifies the subject as the specific person.

The face detection processing is a technology well known in the art and a detailed description thereof is omitted here.

In the case that the identifying unit 4b identifies the subject as a human being, the acquiring unit (an acquiring means) 4c acquires information about the human being.

According to the present embodiment, in the case that the identifying unit 4b identifies the subject as a person, the acquiring unit 4c acquires focus distance information relating to a focus distance of the person which is a distance from the imaging apparatus 100 to the subject identified as the person as information about the person. The focus distance information is acquired when the imaging control unit 4 performs AF control for the subject identified as the person.

Further, in the case that the identifying unit 4b identifies the subject as a human being, the acquiring unit 4c acquires characteristic color information relating to a characteristic color of the human being as information about the human being.

In the present embodiment, the acquiring unit 4c acquires characteristic color information relating to a skin color of a person as a characteristic color of the person. More specifically, the acquiring unit 4c extracts only portions of a standard skin color and colors similar to the standard skin color (similar colors) from the face area F detected by the identifying unit 4b (see FIG. 7A) (in other words, hairs, eyebrows, eyes, and lips are excluded) and calculates an average value (an RGB value) of colors of the extracted portions. The acquiring unit 4c acquires data relating to the RGB value of the skin color of the face (characteristic color information relating to the skin color of the person). The average value may be calculated from hue values (°) of the extracted portions.

Furthermore, in the present embodiment, the acquiring unit 4c acquires characteristic color information relating to a color of clothes of the person as a characteristic color of the person. More specifically, the acquiring unit 4c extracts a portion larger than a predetermined area above and near a skin color area H (see FIG. 7A) different from the face area F from a region of the person identified by the identifying unit 4b and calculates an RGB value of the extracted portion. The acquiring unit 4c acquires data relating to the RGB value of a color of the area which is supposed clothes (characteristic color information relating to the clothes color of the person). In the case that the region of the person identified by the identifying unit 4b includes a plurality of skin color areas, skin color areas of which colors are more similar to the color of the face area F of the person are selected. The characteristic color information relating to a color of clothes of the person is not limited to data relating to an RGB value and may be data relating to a hue value (°).

In the case that the subject is identified as a human being by the identifying unit 4b, the acquiring unit 4c further acquires hand size information relating to the size of a hand of the human being estimated from the size of the face as information about the human being.

More specifically, the acquiring unit 4c acquires hand size information relating to the size of a hand of the person estimated from the face area F by multiplying the length in the vertical direction of the face area F identified by the identifying unit 4b and a predetermined ratio for computation of the hand's size. Here, the hand's size is represented by a length (pixels) from the end of the middle finger to the wrist part of the palm.

In the case that the subject is identified as a specific person by the identifying unit 4b, the acquiring unit 4c further acquires specific information previously stored to correspond to the specific person.

More specifically, in the case that the image data of the face area F identified by the identifying unit 4b accords with face image data relating to a face of a specific person stored in the storage unit 6 (which will be described later), the acquiring unit 4c acquires information relating to a detection condition A corresponding to the specific person from a detection condition table 6b (which will be described later) as the specific information. As shown in FIG. 3, in the case that the subject is identified as a specific person a by the identifying unit 4b, the acquiring unit 4c acquires information relating to the detection condition A (an up and down motion of a hand in a detection area (a predetermined area) T (see FIGS. 7A to 7C)) corresponding to the specific person a as the specific information, for example.

The detecting unit (a detecting means or a control means) 4d sets detection conditions based on the information about the person acquired by the acquiring unit 4c and detects a change in the state of the subject in the detection area (the predetermined area) T (see FIGS. 7A to 7C) within the live view image L displayed in the display panel 8a under the detection conditions. The position and range of the detection area T can be varied and may be specified based on a predetermined manipulation of an operation unit by a user, for example. The whole display screen of the display panel 8a may be designated as the detection area. Alternatively, the identifying unit 4b may identify whether or not a subject is a human being in regions other than the detection area (the predetermined area) T to detect a change in the state of the subject in the detection area T with enhanced accuracy.

The detection condition table 6b shown in FIG. 3 included in the storage unit 6 which will be described later defines detection conditions when the detecting unit 4d detects a change in the state of the subject.

The detection condition table 6b defines detection conditions 1 to 4 and the detection condition A.

More specifically, the detection condition 1 defines that an object should be within a predetermined distance from a subject focus distance (subject focus distance (m)±s(m)). The predetermined distance indicates a distance in the direction of depth of the live view image L and is set to a distance to which a hand of the person who is the subject can reach (for example, 1 m).

The detection condition 2 defines that an object's color should be within a range of colors the same as or similar to the skin color of the person who is identified as the subject by the identifying unit 4b (RGB value of skin color of face±t).

The detection condition 3 defines that a size of an object should be within a range of approximately the same size as the size of the hand (size of hand [pixels]±v[pixels]).

The detection condition 4 defines that an object's color should be within a range of colors the same as or similar to the color of the clothes of the person who is identified as the subject by the identifying unit 4b (RGB value of color of clothes±p).

The detection condition A includes, for example, detection of a motion from up to down in the detection area T (specific information) in the case of the specific person a, detection of a motion from down to up in the detection area T (specific information) in the case of a specific person b, detection of a motion from up to down to up in the detection area T (specific information) in the case of a specific person c, detection of a motion from down to up to down in the detection area T (specific information) in the case of a specific person d, or the like.

The detecting unit 4d refers to the detection condition table 6b shown in FIG. 3 and sets the detection condition 1 (within a predetermined distance from the subject focus distance (subject focus distance (m)±s(m))) by applying the focus distance information acquired by the acquiring unit 4c to the terms of the detection condition 1. A value of "s" can be changed and, for example, may be set based on a predetermined manipulation of the operation unit by the user. Further, the value of "s" needs not to be an absolute number and may be a ratio (%).

Next, the detecting unit 4d sets the detection condition 2 (within a range of colors the same as or similar to the skin color of the person who is identified as the subject by the identifying unit 4b (RGB value of skin color of face±t)) by applying the data relating to the RGB value of the skin color of the face acquired by the acquiring unit 4c to the terms of the detection condition 2 of the detection condition table 6b shown in FIG. 3. As the detection condition 2, "hue value of skin color of face±u[°]" can be used instead of "RGB value of skin color of face±t". Values of "t" and "u" can be changed similarly to the value of "s" as described above. Further, each of the values of "t" and "u" needs not to be an absolute number and may be a ratio (%).

Then, the detecting unit 4d sets the detection condition 3 (within a range of approximately the same size as the size of the hand (size of hand (pixels)±v(pixels))) by applying the hand size information relating to the size of the hand acquired by the acquiring unit 4c to the terms of the detection condition 3 of the detection condition table 6b shown in FIG. 3. A value of "v" can be changed similarly to the value of "s" as described above. Further, the value of "v" needs not to be an absolute number and may be a ratio (%).

Then, the detecting unit 4d sets the detection condition 4 (within a range of colors the same as or similar to the color of the clothes of the person who is identified as the subject by the identifying unit 4b (RGB value of color of clothes±p)) by applying the data relating to the RGB value of the color of the area which is supposed clothes acquired by the acquiring unit 4c to the terms of the detection condition 4 of the detection condition table 6b shown in FIG. 3. As the detection condition 4, "hue value of color of clothes±q[°]" can be used instead of "RGB value of color of clothes±p". Values of "p" and "q" can be changed similarly to the value of "s" as described above. Further, each of the values of "p" and "q" needs not to be an absolute number and may be a ratio (%).

Figure 7A:
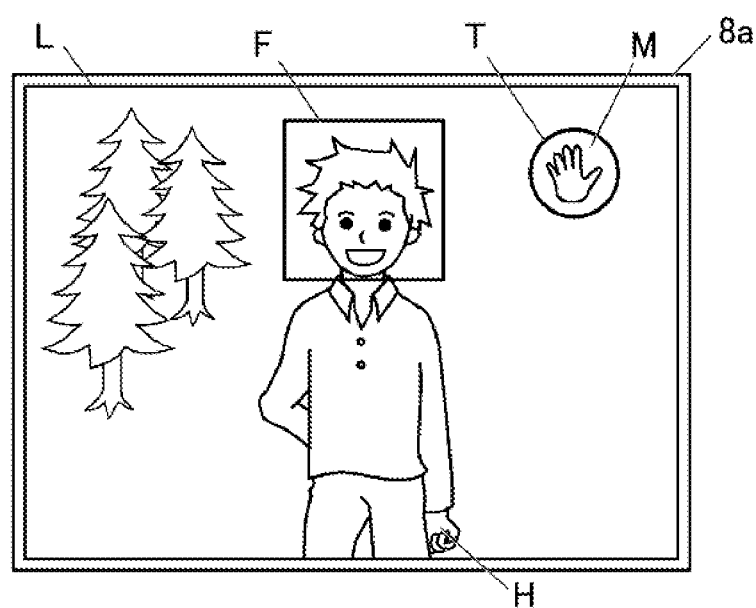
FIGS. 7A, 7B and 7C schematically show examples of a live view image relating to the motion shutter process of FIG. 4.
Figure 7B:
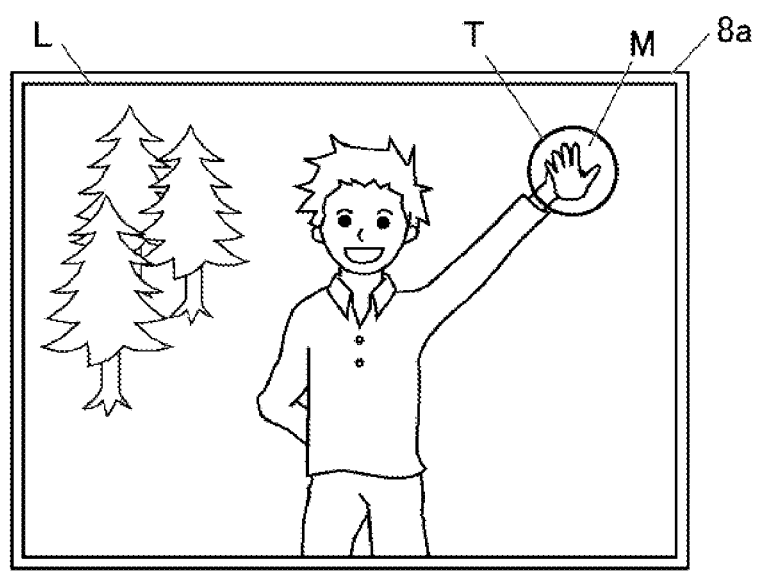
Figure 7C:
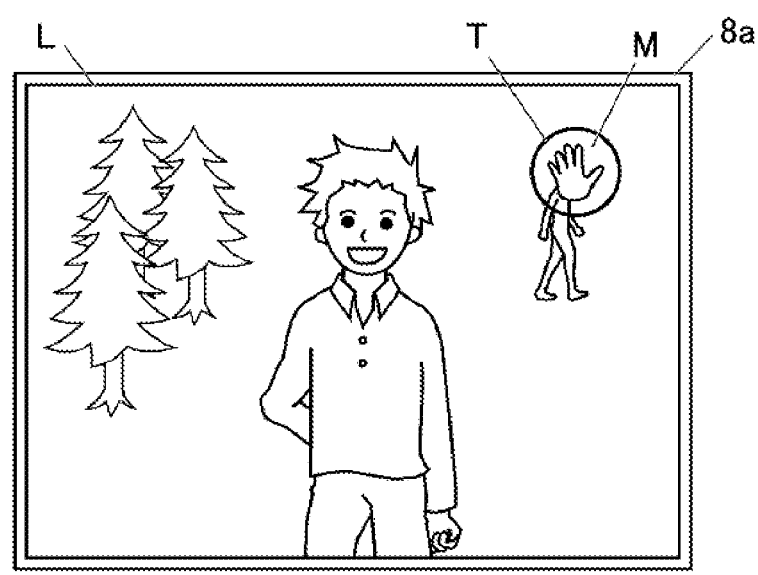

The detecting unit 4d detects changes in images based on changes in values of pixels in the detection area T in which a start indicator M is On-Screen-Displayed (OSD) within the live view images L sequentially displayed as shown in FIG. 7A. In the case that changes in images are detected as shown in FIGS. 7B and 7C, the detecting unit 4d determines whether or not an object in the detection area T satisfies the detection condition 1 (in other words, whether or not the object is within a predetermined distance from the subject focus distance). Here, a distance to the object is measured by performing the AF control for the object by the imaging control unit 4. In the case that it is determined that the detection condition 1 is satisfied (for example, the case of FIG. 7B), the detecting unit 4d determines whether or not the object satisfies one of the detection conditions 2 to 4. In other words, the detecting unit 4d determines whether or not the color of the object is within a range of colors the same as or similar to the skin color of the person who is identified as the subject by the identifying unit 4b, the size of the object is within a range of approximately the same size as the size of the person's hand, or the color of the object is within a range of colors the same as or similar to the color of the clothes of the person who is identified as the subject by the identifying unit 4b. Further, in the case that it is determined that one of the detection conditions 2 to 4 is satisfied, the detecting unit 4d determines that the person (the subject) identified by the identifying unit 4b moves. On the other hand, in the case that it is determined that the detection condition 1 is not satisfied (for example, the case of FIG. 7C) or none of the detection conditions 2 to 4 is satisfied, the detecting unit 4d determines that the person (the subject) identified by the identifying unit 4b does not move.

In the case that the identifying unit 4b identifies the subject as a specific person and the acquiring unit 4c acquires the specific information, the detecting unit 4d sets the detection conditions 1 to 4 and acquires (or sets) the detection condition A based on the specific information. In the case that it is determined that the detection condition 1 is satisfied, one of the detection conditions 2 to 4 is satisfied, and the detection condition A is satisfied, the detecting unit 4d determines that the specific person (the subject) identified by the identifying unit 4b moves. On the other hand, in the case that (i) the detection condition 1 is not satisfied, (ii) the detection condition 1 is satisfied but none of the detection conditions 2 to 4 is satisfied, or (iii) the detection condition 1 is satisfied, one of the detection conditions 2 to 4 is satisfied, but the detection condition A is not satisfied, the detecting unit 4d determines that the specific person (the subject) identified by the identifying unit 4b does not move.

The start control unit (an executing means) 4e executes a process of shooting an image of a subject using the imaging unit 3.

In the present embodiment, in the case that the detecting unit 4d determines that the human being or the specific person identified by the identifying unit 4b moves, the start control unit 4e executes the process of shooting an image of the subject by the imaging unit 3.

More specifically, in the case that the identifying unit 4b identifies the subject as a human being but the human being as not a specific person, the start control unit (the executing means) 4e executes the process of shooting an image of the subject by the imaging unit 3 if the detecting unit 4d determines that the detection condition 1 is satisfied and one of the detection conditions 2 to 4 is satisfied. On the other hand, in the case that the identifying unit 4b identifies the subject as a specific person, the start control unit 4e executes the process of shooting an image of the subject by the imaging unit 3 if the detecting unit 4d determines that the detection condition 1 is satisfied, one of the detection conditions 2 to 4 is satisfied and the detection condition A is satisfied.

The image data generating unit 5 adjusts gain of each color component of RGB for an analog signal of each frame image forwarded from the electronic imaging unit 3b. Then, the image data generating unit 5 executes sampling and holding by a sample and hold circuit (not shown in drawings), executes conversion into digital data by an A/D converter (not shown in drawings), and executes color processing including pixel interpolation processing and γ correction processing by a color processing circuit (not shown in drawings). Then, the image data generating unit 5 generates a digital brightness signal Y and color difference signals Cb and Cr (YUV data).

The image data generating unit 5 transmits the generated image data to the memory 2 used as a buffer memory or the image recording unit 7.

The storage unit 6 is a non-volatile readable/writable memory such as a flash memory or an EEPROM (Electrically Erasable and Programmable Read Only Memory). In the storage unit 6, there are stored the face image data file 6a, the detection condition table 6b, and the like.

In the face image data file 6a, there are stored names of the specific persons a, b, c, d . . . and corresponding face image data of the specific persons a, b, c, d . . . . In the present embodiment, the identifying unit 4b compares the image data of the face area F detected by the identifying unit 4b with the face image data stored in the face image data file 6a to specify the person identified by the identifying unit 4b.

The detection condition table 6b defines the detection conditions to be used when the detecting unit 4d detects a change in the state of the subject as described above.

The image recording unit 7 includes a non-volatile memory (a flash memory), for example. The image recording unit 7 records image data of various images encoded according to a predetermined encoding method by an encoding unit (not shown in the drawings) of the image data generating unit 5.

In the present embodiment, the image recording unit 7 records image data of an image shot when the start control unit 4e executes the shooting process, for example.

Further, the image recording unit 7 may be installed with a removable recording medium (not shown in the drawings) and read/write data from/to the recording medium, for example.

The display unit 8 displays a still picture or a moving picture. More specifically, the display unit 8 includes the display panel 8a and a display control unit 8b.

The display panel 8a displays an image in a display region. More specifically, the display panel 8a displays live view images L by sequentially updating a plurality of image frames generated by imaging of the subject by the imaging unit 3 in a still picture imaging mode or a moving picture imaging mode at a predetermined playback frame rate.

For example, the display panel 8a may include a liquid crystal display (LCD) panel, an organic EL display panel, or the like, without limitation.

The display control unit 8b controls the display panel 8a to display an image in its display region based on image data of a predetermined size which is read out from the memory 2 and/or the image recording unit 7 and encoded. More specifically, the display control unit 8b includes a VRAM (Video Random Access Memory), a VRAM controller, a digital video encoder, and the like. The digital video encoder reads the brightness signal Y and the color difference signals Cb and Cr, which have been read out from the memory 2 and stored in the VRAM (not shown in the drawings), via the VRAM controller from the VRAM under control of the central control unit 1. The digital video encoder generates a video signal based on the data and outputs it to the display panel 8a.

In the present embodiment, in the case that the position determining unit 4a determines that the imaging direction of the imaging unit 3 and the display direction of the display panel 8a are almost the same, the display control unit 8b controls the display panel 8a to display live view images L while sequentially updating a plurality of image frames captured by the imaging unit 3 and generated by the image data generating unit 5 at a predetermined playback frame rate. At the same time, the display control unit 8b reads and acquires image data for indicating start of shooting such as the start indicator M stored in a predetermined storage means (for example, the memory 2) and controls the display panel 8a to on-screen-display the image data so that the image data is superposed onto the live view image L (see FIG. 7A).

The operation input unit 9 is used to input various instructions to the apparatus.

More specifically, the operation input unit 9 includes an operation unit (not shown in the drawings) including a shutter button, a right or left and top or bottom cursor button relating to an instruction of selection of an operation mode, a function, or the like, a decision button, or the like, for example.

In the case that the user manipulates a button of the operation unit, the operation input unit 9 outputs an operation instruction according to the manipulated button to the central control unit 1. The central control unit 1 controls each unit to execute a predetermined action (for example, imaging of the subject) according to the operation instruction input from the operation input unit 9.

The operation input unit 9 may include a touch panel (not shown in the drawings) which is incorporated into the display panel 8a.

<Motion Shutter Process>

In the following, a motion shutter process by the imaging apparatus 100 according to the present embodiment will be described with reference to FIG. 4.

Figure 4:
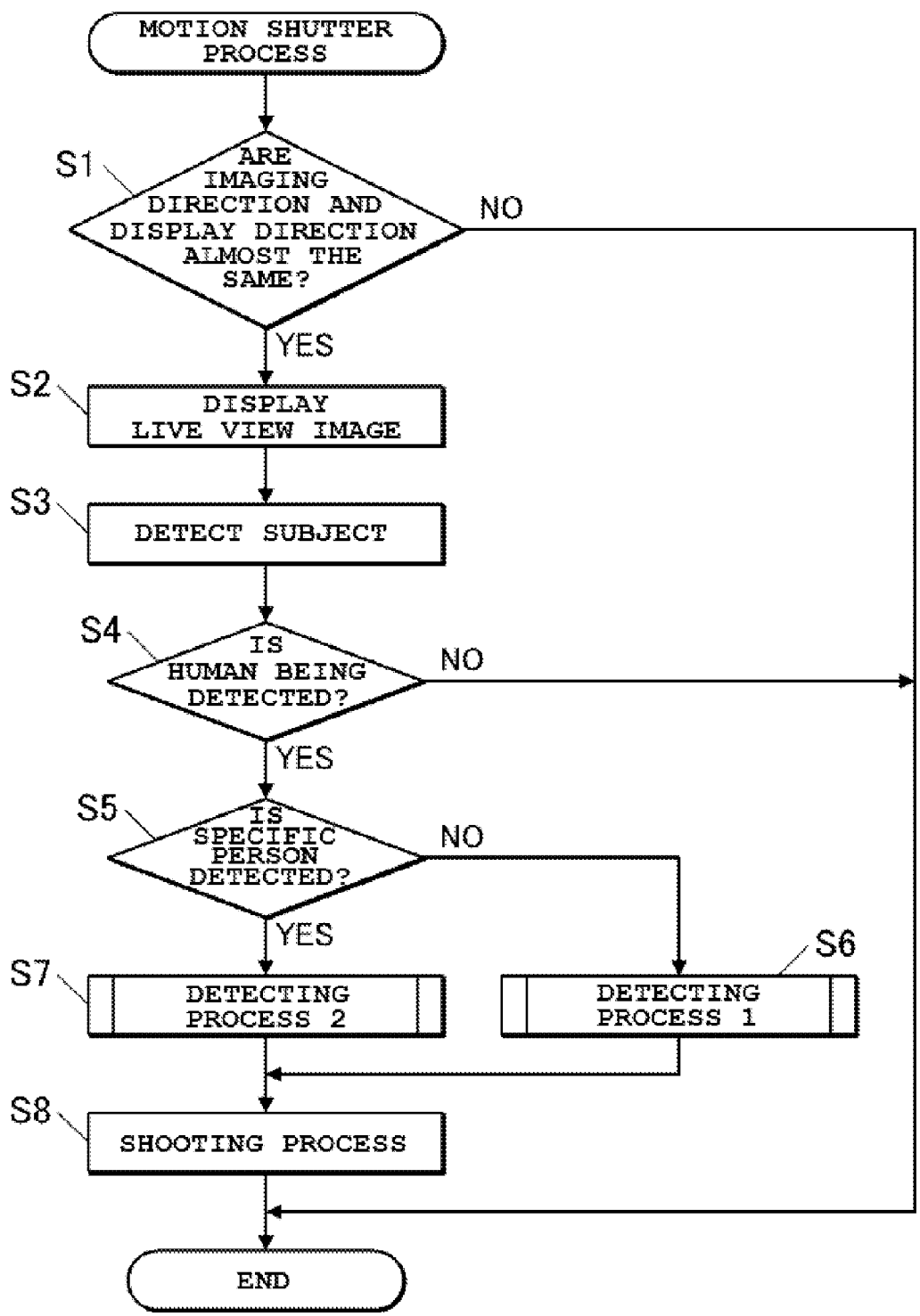
FIG. 4 is an exemplary flow chart for showing steps of a motion shutter process executed by the imaging apparatus of FIG. 1.

FIG. 4 is an exemplary flow chart for showing steps of the motion shutter process.

As shown in FIG. 4, the position determining unit 4a determines whether or not the imaging apparatus is in a position where the imaging direction of the imaging unit 3 and the display direction of the display panel 8a are almost the same (Step S1). In other words, the position determining unit 4a determines whether or not the display panel 8a has been rotated by about 180° with respect to the main body 100A.

In the case that it is determined at Step S1 that the imaging direction of the imaging unit 3 and the display direction of the display panel 8a are almost the same (Step S1; YES), the display control unit 8b controls the display panel 8a to display live view images L while sequentially updating a plurality of image frames captured by the imaging unit 3 and generated by the image data generating unit 5 at a predetermined playback frame rate. At the same time, the display control unit 8b reads and acquires image data for indicating start of shooting such as the start indicator M stored in a predetermined storage means (for example, the memory 2) and controls the display panel 8a to on-screen-display the image data so that the image data is superposed onto the live view image L (Step S2; see FIG. 7A). On the other hand, in the case that it is determined at Step S1 that the imaging direction of the imaging unit 3 and the display direction of the display panel 8a are not almost the same (Step S1; NO), the motion shutter process ends.

Then, the identifying unit 4b executes predetermined face detection processing and identifies a subject from the live view image L which is being displayed in the display panel 8a (Step S3).

In the case that the subject is not identified as a human being within a predetermined time period (Step S4; NO), the motion shutter process ends. On the other hand, in the case that the subject is identified as a human being within the predetermined time period (Step S4; YES), the identifying unit 4b determines whether or not the subject is a specific person (Step S5).

In the case that it cannot be determined within a predetermined time period whether or not the human being identified as the subject is a specific person at Step S5 (Step S5; NO), a detecting process 1 (Step S6) and a shooting process (Step S8) are performed and the motion shutter process ends. The detecting process 1 will be described later.

On the other hand, in the case that it can be determined within the predetermined time period whether or not the human being identified as the subject is a specific person at Step S5 (Step S5; YES), a detecting process 2 (Step S7) and the shooting process (Step S8) are performed and the motion shutter process ends. The detecting process 2 will be described later.

<Detecting Process 1>

The detecting process 1 is more fully described below with reference to FIG. 5.

FIG. 5 is an exemplary flow chart for showing steps of the detecting process 1.

As shown in FIG. 5, the detecting unit 4d first sets the detection condition 1 by applying the focus distance information acquired by the acquiring unit 4c to the terms of the detection condition 1 of the detection condition table 6b (Step S11).

Then, the detecting unit 4d sets the detection condition 2 by applying the data relating to the RGB value of the skin color of the face acquired by the acquiring unit 4c to the terms of the detection condition 2 of the detection condition table 6b (Step S12).

Then, the detecting unit 4d sets the detection condition 3 by applying the hand size information relating to the size of the hand acquired by the acquiring unit 4c to the terms of the detection condition 3 of the detection condition table 6b (Step S13).

Then, the detecting unit 4d sets the detection condition 4 by applying the data relating to the RGB value of the color of the area which is supposed clothes acquired by the acquiring unit 4c to the terms of the detection condition 4 of the detection condition table 6b (Step S14).

Then, the detecting unit 4d determines whether or not a movement of an object is detected in the detection area T based on a change in values of pixels in the detection area T in which the start indicator M is On-Screen-Displayed (OSD) within the live view images L (Step S15).

At Step S15, in the case that it is determined that the object's movement is not detected in the detection area T (Step S15; NO), the detecting unit 4d repeats Step S15. In the case that it is determined at Step S15 that the object's movement is detected in the detection area T (Step S15; YES), the detecting unit 4d determines whether or not the detection condition 1 is satisfied, or in other words, the object is within a predetermined distance from the subject focus distance (Step S16).

In the case that the detection condition 1 is not satisfied (Step S16; NO), the detecting unit 4d returns to Step S15 and determines whether or not the object's movement is detected in the detection area T (Step S15). On the other hand, in the case that it is determined at Step S16 that the detection condition 1 is satisfied (Step S16; YES), the detecting unit 4d determines whether or not the detection condition 2 is satisfied, or in other words, the object's color is within a range of colors the same as or similar to the skin color of the person who is identified as the subject by the identifying unit 4b (Step S17).

In the case that it is determined at Step S17 that the detection condition 2 is satisfied (Step S17; YES), the detecting process 1 ends. On the other hands, in the case that it is determined at Step S17 that the detection condition 2 is not satisfied (Step S17; NO), the detecting unit 4d determines whether or not the detection condition 3 is satisfied, or in other words, the size of the object is within a range of approximately the same size as the size of the hand of the person (Step S18).

In the case that it is determined at Step S18 that the detection condition 3 is satisfied (Step S18; YES), the detecting process 1 ends. On the other hands, in the case that it is determined at Step S18 that the detection condition 3 is not satisfied (Step S18; NO), the detecting unit 4d determines whether or not the detection condition 4 is satisfied, or in other words, the object's color is within a range of colors the same as or similar to the color of the clothes of the person who is identified as the subject by the identifying unit 4b (Step S19).

In the case that it is determined at Step S19 that the detection condition 4 is satisfied (Step S19; YES), the detecting process 1 ends. On the other hands, in the case that it is determined at Step S19 that the detection condition 4 is not satisfied (Step S19; NO), the process returns to Step S15 and the detecting unit 4d determines whether or not the object's movement is detected in the detection area T (Step S15). In the case that the detecting process 1 does not end even after a predetermined time period elapses, the motion shutter process is ended.

<Detecting Process 2>

The detecting process 2 is more fully described below with reference to FIG. 6.

FIG. 6 is an exemplary flow chart for showing steps of the detecting process 2. The detecting process 2 includes the same steps as those of the detecting process 1 except Step 25 of acquiring the detection condition A and Step S31 of determining whether or not the detection condition A is satisfied.

As shown in FIG. 6, the detecting unit 4d sets the detection conditions 1 to 4 in the same way as the detecting process 1 (Steps S21 to S24). Then, the detecting unit 4d acquires the detection condition A based on the specific information acquired by the acquiring unit 4c (Step S25).

Then, in the same way as the detecting process 1, the detecting unit 4d determines whether or not a movement of the object is detected in the detection area T based on a change in values of pixels in the detection area T in which the start indicator M is On-Screen-Displayed (OSD) within the live view images L (Step S26).

At Step S26, in the case that it is determined that the object's movement is not detected in the detection area T (Step S26; NO), the detecting unit 4d repeats Step S26. In the case that it is determined at Step S26 that the object's movement is detected in the detection area T (Step S26; YES), the detecting unit 4d determines whether or not the detection condition 1 is satisfied (Step S27).

In the case that it is determined at Step S27 that the detection condition 1 is not satisfied (Step S27; NO), the detecting unit 4d returns to Step S26 and determines whether or not the object's movement is detected in the detection area T (Step S26). On the other hand, in the case that it is determined at Step S27 that the detection condition 1 is satisfied (Step S27; YES), the detecting unit 4d determines whether or not the detection condition 2 is satisfied (Step S28).

In the case that it is determined at Step S28 that the detection condition 2 is satisfied (Step S28; YES), the process moves to Step S31. On the other hands, in the case that it is determined at Step S28 that the detection condition 2 is not satisfied (Step S28; NO), the detecting unit 4d determines whether or not the detection condition 3 is satisfied (Step S29).

In the case that it is determined at Step S29 that the detection condition 3 is satisfied (Step S29; YES), the process moves to Step S31. On the other hands, in the case that it is determined at Step S29 that the detection condition 3 is not satisfied (Step S29; NO), the detecting unit 4d determines whether or not the detection condition 4 is satisfied (Step S30).

In the case that it is determined at Step S30 that the detection condition 4 is satisfied (Step S30; YES), the process moves to Step S31. On the other hands, in the case that it is determined at Step S30 that the detection condition 4 is not satisfied (Step S30; NO), the process returns to Step S26 and the detecting unit 4d performs the subsequent steps.

Then, at Step S31, the detecting unit 4d determines whether or not the detection condition A is satisfied (Step S31). In the case that it is determined that the detection condition A is satisfied (Step S31; YES), the detecting process 2 ends. On the other hand, in the case that it is determined that the detection condition A is not satisfied (Step S31; NO), the process returns to Step S26 and the detecting unit 4d performs the subsequent steps. In the case that the detecting process 1 does not end even after a predetermined time period elapses, the motion shutter process is ended.

As above, in the case of imaging a person who is a subject by a motion shutter process (for example, in the case of taking a self-portrait), the imaging apparatus 100 according to the present embodiment sets detection conditions based on information about the person and detects a change in the state of a predetermined object in a detection area T on which a start indicator M is on-screen-displayed within a live view image L under the detection conditions.

Therefore, in the case that an image of a person or an object which does not satisfy the detection conditions is taken and appears in the detection area T, it is possible to prevent a change in the state of the person or the object from being detected. As a result, it is possible to detect only a change in the state of a predetermined object which satisfies the detection conditions.

More specifically, according to the present embodiment, the detection condition 1 (within a predetermined distance from the subject focus distance) is set based on the focus distance information relating to a focus distance of a person identified as a subject and a change in the state of a predetermined object is detected under the detection condition 1.

Thus, since it is possible to exclude a change in the state of an object which is not within the predetermined distance from the subject focus distance from detection, the present embodiment can prevent detection errors, for example, resulted by a person other than a subject or a car passing behind the subject.

Further, according to the present embodiment, the detection condition 2 (within a range of colors the same as or similar to the skin color of the person who is identified as the subject) is set based on the characteristic color information relating to the skin color of the person who is identified as the subject and a change in the state of a predetermined object is detected under the detection condition 2.

Thus, in the case a color of an object is not within the range of colors the same as or similar to the skin color of the person who is identified as the subject even if the object satisfies the detection condition 1, it is possible to exclude a change in the state of the object from detection. Therefore, the present embodiment can prevent detection errors more certainly.

Further, according to the present embodiment, the detection condition 3 (within a range of approximately the same size as the size of the hand) is set based on the hand size information relating to a size of the hand estimated from the size of the face of the person identified as the subject and a change in the state of a predetermined object is detected under the detection condition 3.

Thus, in the case a size of an object is not within the range of approximately the same size as the size of the hand of the person who is identified as the subject even if the object satisfies the detection condition 1, it is possible to exclude a change in the state of the object from detection. Therefore, the present embodiment can prevent detection errors more certainly.

Further, according to the present embodiment, the detection condition 4 (within a range of colors the same as or similar to the color of the clothes of the person who is identified as the subject) is set based on the characteristic color information relating to the clothes color of the person who is identified as the subject and a change in the state of a predetermined object is detected under the detection condition 4.

Thus, in the case a color of an object is not within the range of colors the same as or similar to the color of the clothes of the person who is identified as the subject even if the object satisfies the detection condition 1, it is possible to exclude a change in the state of the object from detection. Therefore, the present embodiment can prevent detection errors more certainly.

Further, according to the present embodiment, in the case that the human being identified as the subject is a specific person, the detection condition A (for example, in the case that the specific person is the person a, whether or not a motion from up to down is detected in the detection area T) is set based on the specific information previously stored corresponding to the specific person and a change in the state of a predetermined object is detected under the detection condition A.

Thus, in the case the object's movement does not satisfy the detection condition A even if the object satisfies the detection condition 1 and one of the detection conditions 2 to 4, it is possible to exclude a change in the state of the object from detection. Therefore, the present embodiment can prevent detection errors more certainly.

Further, according to the present embodiment, it is possible to set the position of the detection area T in the live view image L irrespective of the position of the person identified as the subject.

Therefore, since it is possible to set the detection area T to a position desired by the user, the person who is identified as the subject can take an image of herself/himself in her/his desired pose while detecting a change in the state of a predetermined object at the position desired by the user.

Second Embodiment

Next, an imaging apparatus 200 according to a second embodiment of the present invention will be described. The imaging apparatus 200 basically includes the same configuration as the imaging apparatus 100 of the first embodiment and elements the same or equivalent to those of the imaging apparatus 100 are designated by the same reference numerals. Aspects of the second embodiment that are different from the first embodiment are mainly described hereafter.

The imaging apparatus 200 according to the second embodiment is characterized by changing threshold values (sensitivity of motion detection) when performing motion detection (a detecting process 1 (see FIG. 9), a detecting process 2 (see FIG. 10)) based on the focus distance information and focal length information.

Hereinafter, the detecting unit 4d of the present embodiment is described.

The detecting unit 4d of the present embodiment sets a threshold when detecting a state in the detection area T within a live view image L based on the focus distance information relating to a distance from the imaging apparatus 200 to a person identified as a subject by the identifying unit 4b (the focus distance) and the focal length information relating to a focal length of the lens of the lens unit 3a when the AF control is performed for the person.

More specifically, the detecting unit 4d sets the threshold to a value acquired by multiplying the reciprocal of the focus distance, the focal length and a predetermined coefficient. In the case that an amount of change in pixel values (brightness, color) in the detection area T between a plurality of image frames captured by the imaging unit 3 is greater than or equal to the threshold, the detecting unit 4d determines that there is a change in the state in the detection area T within live view images L.

Figure 8A:
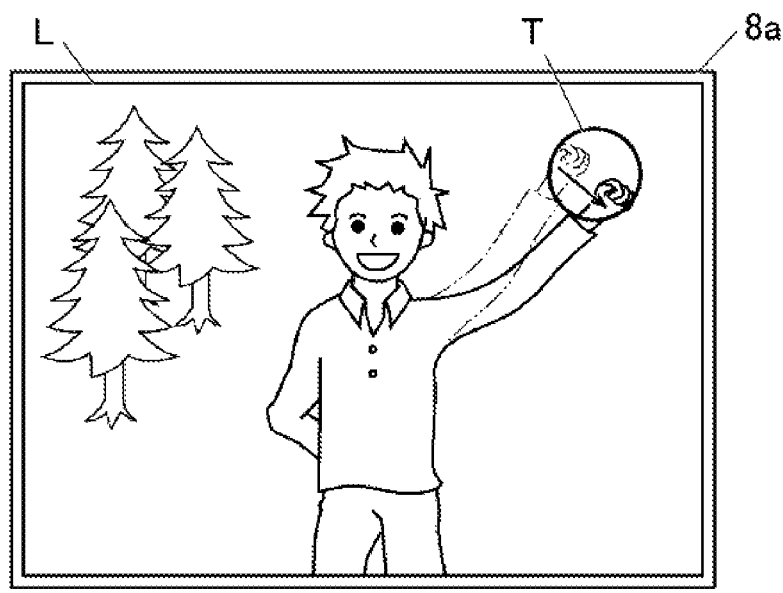
FIGS. 8A and 8B show examples of a movement of an object in a detection area.
Figure 8B:
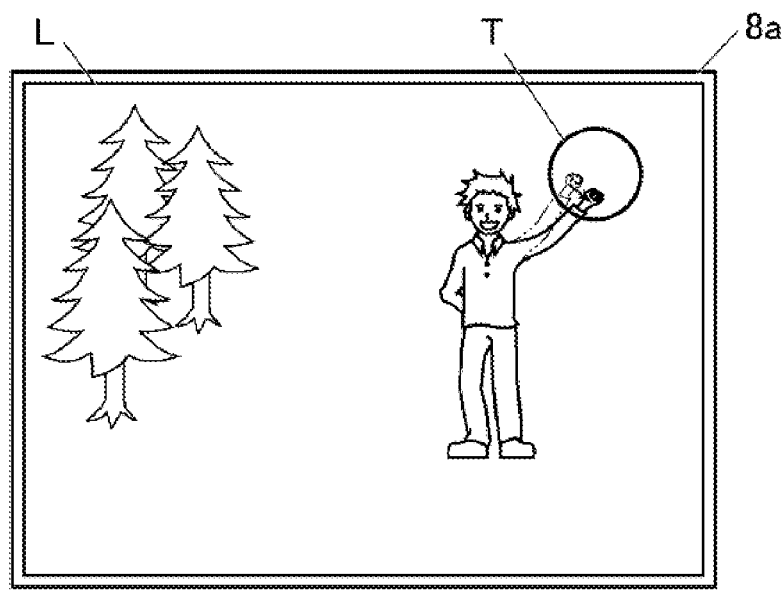

For example, in the case that, as shown in FIG. 8B, the focus distance from the imaging apparatus 200 to a person (a boy) who is a subject is longer than that of FIG. 8A and the focal length is shorter than that of FIG. 8A, the threshold is smaller than that of FIG. 8A. Thus, as shown in FIG. 8B, even in the case that amplitude of a movement of a hand of the boy who is the subject is smaller than that of FIG. 8A, or, in other words, an amount of change in pixel values in the detection area T in live view images L is smaller than that of FIG. 8A, it is possible to detect movements of the hand (a change in the state) of the boy by lowering the threshold (or by enhancing sensitivity of motion detection).

<Detecting Process 1>

Figure 9:
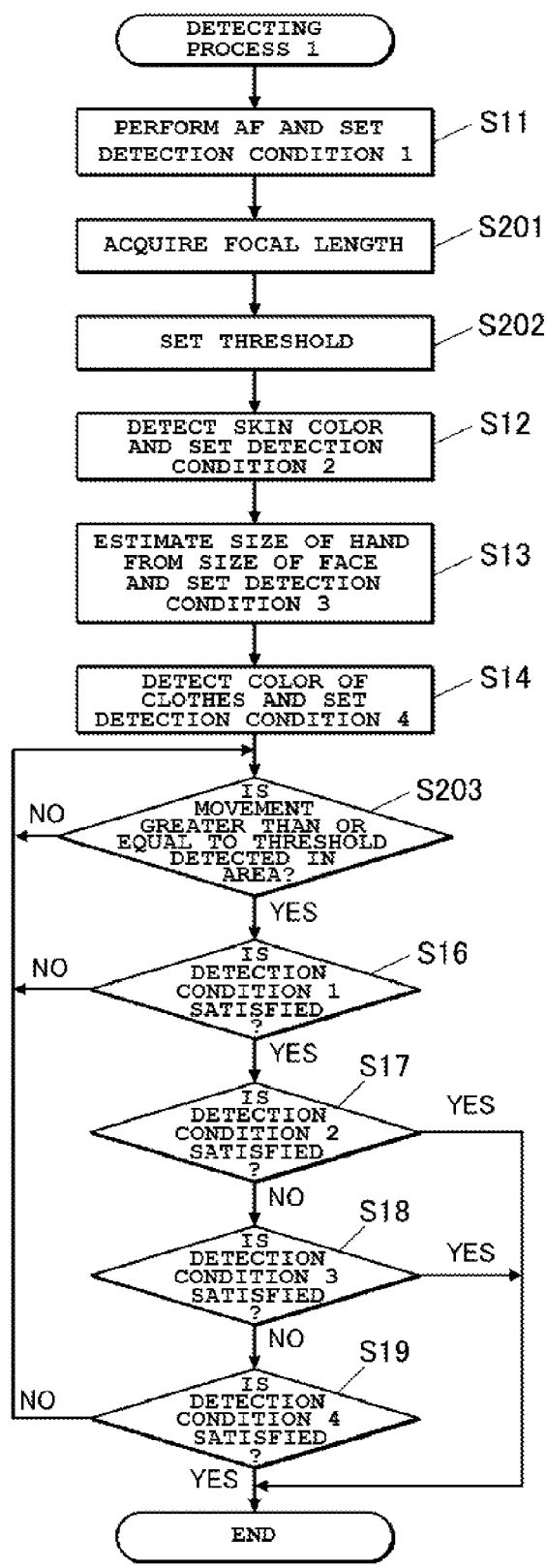
FIG. 9 is an exemplary flow chart for showing steps of a detecting process 1 according to a second embodiment.

FIG. 9 is a flow chart for showing a detecting process 1 according to the second embodiment.

As shown in FIG. 9, in the detecting process 1 of the second embodiment, the Step S11 is performed in the same way as the first embodiment and then the detecting unit 4d acquires the focal length information relating to a focal length of the lens of the lens unit 3a when the focus distance information relating to a distance from the imaging unit 200 to a person identified as a subject is acquired (in other words, the AF control is performed for the person) (Step S201). Then, the detecting unit 4d sets a threshold to a value acquired by multiplying the reciprocal of the value of the acquired focus distance, the value of the focal length and a predetermined coefficient (Step S202). Then, the detecting unit 4d performs Steps S12 to S14 in the same way as the first embodiment.

After that, the detecting unit 4d determines whether or not an object's movement greater than or equal to the threshold is detected in the detection area T based on a change in values of pixels in the detection area T in which the start indicator M is on-screen-displayed within the live view image L (Step S203).

In the case that it is determined at Step S203 that the object's movement greater than or equal to the threshold is not detected in the detection area T (Step S203; NO), the detecting unit 4d repeats Step S203. On the other hand, in case that it is determined at Step S203 that a movement of the object greater than or equal to the threshold is detected in the detection area T (Step S203; YES), the detecting unit 4d performs the subsequent steps (Steps S16 to S19) and then the detecting process 1 ends.

<Detecting Process 2>

Figure 10:
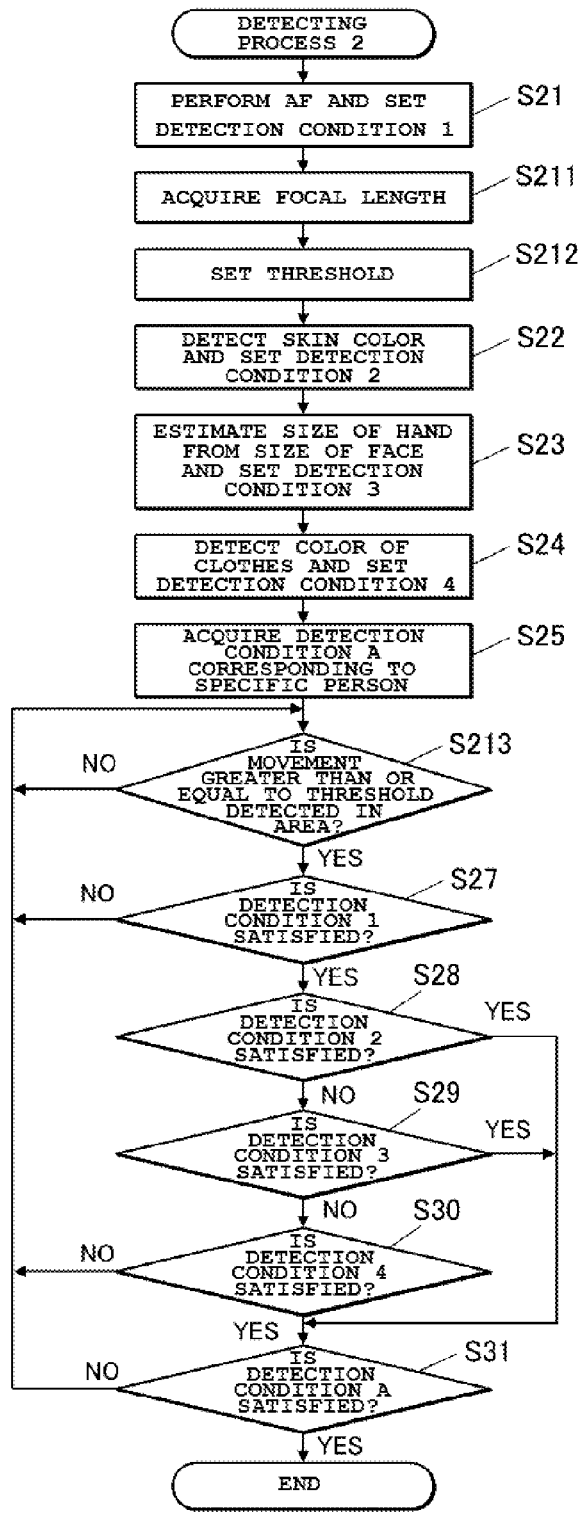
FIG. 10 is an exemplary flow chart for showing steps of a detecting process 2 according to the second embodiment.

FIG. 10 is a flow chart for showing a detecting process 2 according to the second embodiment.

As shown in FIG. 10, in the detecting process 2 of the second embodiment, the Step S21 is performed in the same way as the first embodiment and then the detecting unit 4d acquires the focal length information relating to the focal length of the lens of the lens unit 3a when the focus distance information relating to the distance from the imaging unit 200 to the person identified as the subject is acquired (in other words, the AF control is performed for the person) (Step S211). Then, the detecting unit 4d sets a threshold to a value acquired by multiplying the reciprocal of the value of the acquired focus distance, the value of the focal length and a predetermined coefficient (Step S212). Then, the detecting unit 4d performs Steps S21 to S25 in the same way as the first embodiment.

After that, the detecting unit 4d determines whether or not an object's movement greater than or equal to the threshold is detected in the detection area T based on a change in values of pixels in the detection area T in which the start indicator M is on-screen-displayed within the live view image L (Step S213).

In the case that it is determined at Step S213 that the object's movement greater than or equal to the threshold is not detected in the detection area T (Step S213; NO), the detecting unit 4d repeats Step S213. On the other hand, in case that it is determined at Step S213 that a movement greater than or equal to the threshold is detected in the detection area T (Step S213; YES), the detecting unit 4d performs the subsequent steps (Steps S27 to S31) and then the detecting process 2 ends.

As above, according to the imaging apparatus 200 of the second embodiment, the detecting unit 4d sets the threshold for detecting a state (for example, movement of the hand of the person who is the subject) in the detection area T within the live view image L based on the focus distance information relating to the distance from the imaging apparatus 200 to the person identified as the subject by the identifying unit 4b (the focus distance) and the focal length information relating to the focal length of the lens of the lens unit 3a when the AF control is performed for the person.

Thus, since the threshold for detecting the state (for example, movement of the hand of the person who is the subject) in the detection area T within the live view image L is set based on the focus distance information and the focal length information, it is possible to change the value of the threshold according to the focus distance information and the focal length information.

Accordingly, sensitivity of motion detection can be changed according to the set threshold and it is possible to set the sensitivity to a value proper to a situation of imaging the subject. Therefore, the sensitivity of motion detection can be enhanced and a stable motion shutter function can be provided.

According to the imaging apparatus 200 of the second embodiment, if the focus distance based on the focus distance information is longer and the focal length based on the focal length information is shorter, the threshold is set to a smaller value.

Therefore, for example, the smaller the set threshold is, the higher the sensitivity of motion detection is.

Thus, since it is possible to enhance the sensitivity of motion detection in the case that the distance from the imaging apparatus 200 to the subject is long and an image of the subject is small, movements of the subject can be properly detected even if a change in the movements is small.

MODIFIED EXAMPLE

Next, an imaging apparatus 200T which is a modified example of the second embodiment will be described. The imaging apparatus 200T basically includes the same configuration as the imaging apparatus 100 of the first embodiment and the imaging apparatus 200 of the second embodiment and elements the same or equivalent to those of the imaging apparatus 100 and the imaging apparatus 200 are designated by the same reference numerals. Aspects of the modified example that are different from the first and the second embodiments are mainly described hereafter.

The imaging apparatus 200T which is the modified example of the second embodiment is characterized by changing threshold values (sensitivity of motion detection) when performing motion detection (a detecting process 1 (see FIG. 11), a detecting process 2 (see FIG. 12)) based face size information relating to the size of the face of a person who is a subject on instead of the focus distance information and focal length information.

Hereinafter, the acquiring unit 4c and the detecting unit 4d of the present modified example are described.

In the case that the identifying unit 4b identifies the subject as a person, the acquiring unit 4c of the present modified example acquires subject size information relating to a size of the person as information about the person.

More specifically, the acquiring unit 4c acquires the face size information relating to the size of the face of the person from the face area F of the person identified by the identifying unit 4b (see FIG. 7A) as the subject size information. Here, the size of the person's face is represented by the area of the face area F of the person identified by the identifying unit 4b, for example.

The detecting unit 4d of the present modified example sets a threshold for detecting a state in the detecting area T within the live view image L based on the face size information acquired by the acquiring unit 4d. More specifically, the detecting unit 4d sets the threshold to a value acquired by multiplying the value of the face size of the person and a predetermined coefficient. Therefore, since the threshold goes down (the sensitivity of motion detection is enhanced) as the face size of the person decreases, it is possible to detect movements of the subject (a change in the state) even in the case an amount of a change in values of pixels in the detection area T within the live view image L is small as shown in FIG. 8B, for example.

<Detecting Process 1>

Figure 11:
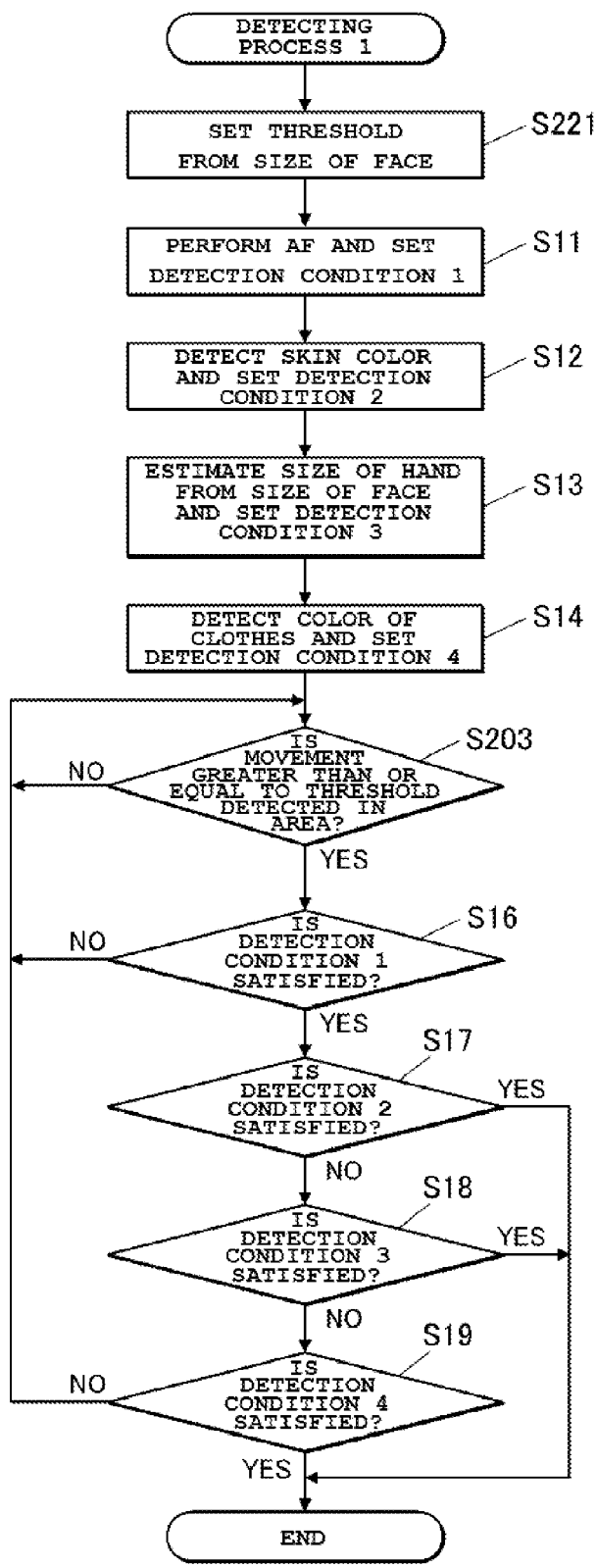
FIG. 11 is an exemplary flow chart for showing steps of a detecting process 1 according to a modified example of the second embodiment.

FIG. 11 is a flow chart for showing a detecting process 1 according to the present modified example.

As shown in FIG. 11, in the detecting process 1 of the present modified example, the detecting unit 4d first sets a threshold to a value acquired by multiplying the value of the face size of the person based on the face size information acquired by the acquiring unit 4c and a predetermined coefficient (Step S221). Then, the detecting unit 4d performs Steps S11 to S14 in the same way as the first embodiment.

After that, the detecting unit 4d determines whether or not an object's movement greater than or equal to the threshold is detected in the detection area T based on a change in values of pixels in the detection area T in which the start indicator M is on-screen-displayed within the live view image L similarly with the second embodiment (Step S203).

In the case that it is determined at Step S203 that the object's movement greater than or equal to the threshold is not detected in the detection area T (Step S203; NO), the detecting unit 4d repeats Step S203. On the other hand, in case that it is determined at Step S203 that a movement of the object greater than or equal to the threshold is detected in the detection area T (Step S203; YES), the detecting unit 4d performs the subsequent steps (Steps S16 to S19) and then the detecting process 1 ends.

<Detecting Process 2>

Figure 12:
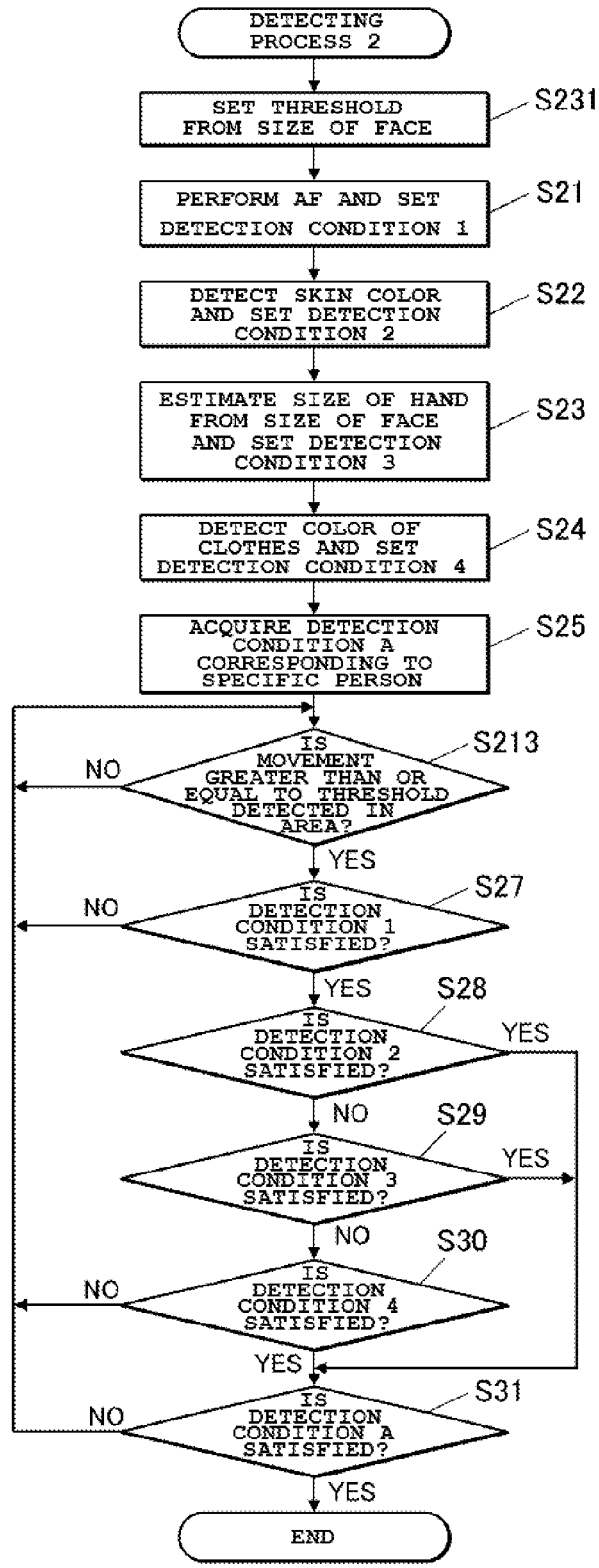
FIG. 12 is an exemplary flow chart for showing steps of a detecting process 2 according to a modified example of the second embodiment.

FIG. 12 is a flow chart for showing a detecting process 2 according to the present modified example.

As shown in FIG. 12, in the detecting process 2 of the present modified example, the detecting unit 4d first sets a threshold to a value acquired by multiplying the value of the face size of the person based on the face size information acquired by the acquiring unit 4c and a predetermined coefficient (Step S231). Then, the detecting unit 4d performs Steps S21 to S25 in the same way as the first embodiment.

After that, the detecting unit 4d determines whether or not an object's movement greater than or equal to the threshold is detected in the detection area T based on a change in values of pixels in the detection area T in which the start indicator M is on-screen-displayed within the live view image L similarly with the second embodiment (Step S213).

In the case that it is determined at Step S213 that no movement greater than or equal to the threshold is detected in the detection area T (Step S213; NO), the detecting unit 4d repeats Step S213. On the other hand, in case that it is determined at Step S213 that a movement of the object greater than or equal to the threshold is detected in the detection area T (Step S213; YES), the detecting unit 4d performs the subsequent steps (Steps S27 to S31) and then the detecting process 2 ends.

As above, according to the imaging apparatus 200T of the present modified example, the detecting unit 4d sets the threshold for detecting a state (for example, movement of the hand of the person who is the subject) in the detection area T within the live view image L based on the face size information acquired by the acquiring unit 4c.

Thus, since the threshold for detecting the state (for example, movement of the hand of the person who is the subject) in the detection area T within the live view image L is set based on the face size information, it is possible to change the value of the threshold according to the face size information.

Accordingly, sensitivity of motion detection can be changed according to the set threshold and it is possible to set the sensitivity to a value proper to a situation of imaging the subject. Therefore, the sensitivity of motion detection can be enhanced and a stable motion shutter function can be provided.

Further, since the face size information is acquired when the identifying unit 4b executes the predetermined face detection processing according to the imaging apparatus 200T of the present modified example, it is possible to reduce processing burden of acquiring the face size information.

Furthermore, according to the imaging apparatus 200T of the present modified example, if the size of the face of the person based on the face size information is smaller, the threshold is set to a smaller value.

Therefore, for example, the smaller the set threshold is, the higher the sensitivity of motion detection is.

In the case that the face size of the person who is the subject is small, it is regarded that the distance from the imaging apparatus 200T to the subject is long. Thus, it is possible to enhance the sensitivity of motion detection and movements of the subject can be properly detected even if a change in the movements is small.

Third Embodiment

Next, an imaging apparatus 300 according to a third embodiment of the present invention will be described. The imaging apparatus 300 basically includes the same configuration as the imaging apparatus 100 of the first embodiment and elements the same or equivalent to those of the imaging apparatus 100 are designated by the same reference numerals. Aspects of the third embodiment that are different from the first embodiment are mainly described hereafter.

The imaging apparatus 300 of the third embodiment is characterized by determining that an object's movement is significant in the case that the movement in the detection area T is detected and a change in values of pixel in the detection area T is larger than or equal to a threshold and executing a shooting process.

Hereinafter, the acquiring unit 4c, the start control unit 4e, and the imaging control unit 4 of the present embodiment are described.

When the detecting unit 4d detects a movement of an object (a change in the state) in the detection area T, the acquiring unit 4c of the present embodiment acquires focus distance information relating to a focus distance to a location in which the object's movement is detected.

The imaging control unit (an determining means) 4 of the present embodiment determines whether or not the object's movement detected by the detecting unit 4d is significant based on the focus distance information acquired by the acquiring unit 4c.

More specifically, the imaging control unit 4 sets a threshold for determining whether or not the object's movement detected by the detecting unit 4d is significant based on the focus distance information relating to the focus distance which is a distance to a location in which the object's movement is detected when the detecting unit 4d detects the object's movement in the detection area T and the focal length information relating to a focal length of the lens of the lens unit 3a when the AF control is performed for the location in which the object's movement is detected. The detecting unit 4d sets the threshold to a value acquired by multiplying the reciprocal of the value of the focus distance, the value of the focal length and a predetermined coefficient.

Further, the imaging control unit 4 determines whether or not an amount of change in values of pixels in the detection area T when the object's movement is detected by the detecting unit 4d in the detection area T is greater than or equal to the threshold. In the case that it is determined that the amount of change in values of pixels in the detection area T is greater than or equal to the threshold, the imaging control unit 4 determines that the object's movement is significant. On the other than, in the case that it is determined that the amount of change in values of pixels in the detection area T is smaller than the threshold, the imaging control unit 4 determines that the object's movement is insignificant.

In the case that the imaging control unit 4 determines that the object's movement is significant, the start control unit 4e executes the process of shooting an image of the subject by the imaging unit 3.

<Motion Shutter Process>

Figure 13:
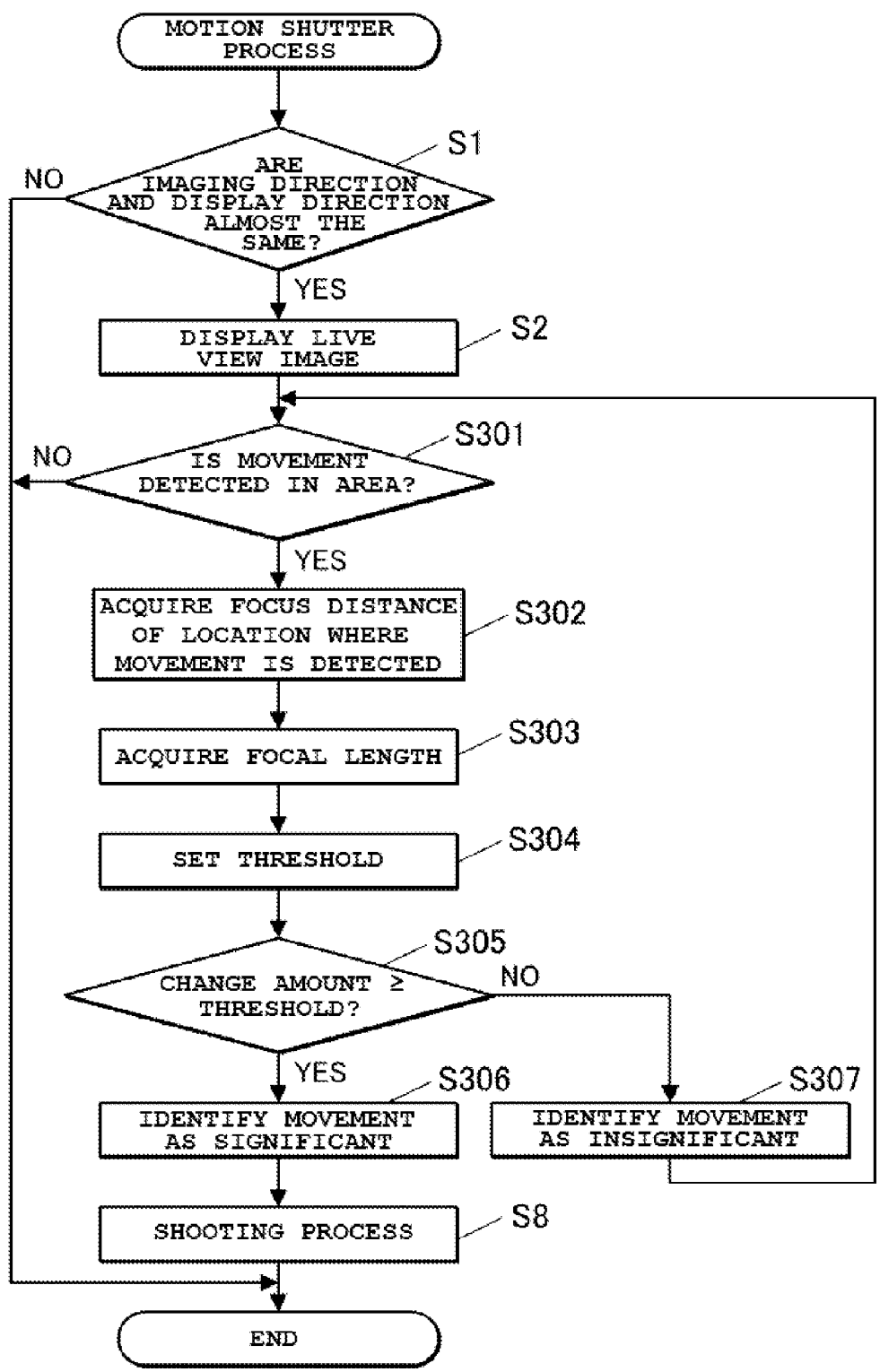
FIG. 13 is an exemplary flow chart for showing steps of a motion shutter process according to a third embodiment.

FIG. 13 is a flow chart for showing of a motion shutter process according to the present embodiment.

As shown in FIG. 13, in the motion shutter process according to the present embodiment, Step S1 and Step S2 are performed in the same way as the first embodiment.

After that, the detecting unit 4d determines whether or not a movement of an object is detected in the detection area T based on a change in values of pixels in the detection area T in which the start indicator M is On-Screen-Displayed (OSD) within the live view images L (Step S301).

In the case that it is determined at Step S301 that the object's movement is not detected in the detection area T (Step S301; NO), the motion shutter process ends. On the other hand, in the case that it is determined at Step S301 that the object's movement is detected in the detection area T (Step S301; YES), the acquiring unit 4c acquires the focus distance information relating to the focus distance to a location in which the object's movement is detected when the detecting unit 4d detects the object's movement in the detection area T (Step S302).

Then, the imaging control unit 4 acquires the focal length information relating to the focal length of the lens of the lens unit 3a when the detecting unit 4d detects the object's movement in the detection area T and the AF control is performed for the location in which the object's movement is detected (Step S303).

Then, the imaging control unit 4 sets a threshold to a value acquired by multiplying the reciprocal of the value of the acquired focus distance, the value of the focal length and a predetermined coefficient (Step S304).

Then, the imaging control unit 4 determines whether or not the a change in values of pixels in the detection area T is greater than or equal to the threshold when the detecting unit detects the object's movement in the detection area T (Step S305).

In the case that it is determined at Step S305 that the change in values of pixels in the detection area T is greater than or equal to the threshold (Step S305; YES), the imaging control unit 4 determines that the object's movement is significant (Step S306). Then, the shooting process is executed (Step S8) similarly with the first embodiment and the motion shutter process ends.

In the case that it is determined at Step S305 that the change in values of pixels in the detection area T is smaller than the threshold (Step S305; NO), imaging control unit 4 determines that the object's movement is insignificant (Step S307). The, the process return to Step S301 and the subsequent steps are repeated.

As above, according to the imaging apparatus 300 of the third embodiment, the acquiring unit 4c acquires the focus distance information relating to a focus distance which is a distance to a location in which a state change is detected when the detecting unit 4d detects the state change in the detection area T and the imaging control unit 4 determines whether or not the state change detected by the detecting unit 4d is significant based on the focus distance information acquired by the acquiring unit 4c.

Thus, since a determination on whether to execute the shooting process by the imaging unit 3 is made, for example, by determining whether or not the state change detected by the detecting unit 4d is significant, it is possible to execute the shooting process only when the user intends.

As above, according to the imaging apparatus 300 of the third embodiment, the imaging control unit 4 sets the threshold for determining whether or not the object's movement detected by the detecting unit 4d is significant based on the focus distance information relating to a focus distance to a location in which the object's movement is detected when the object's movement is detected in the detection area T by the detecting unit 4d and the focal length information relating to a focal length of the lens of the lens unit 3a when the AF control is performed for the location in which the object's movement is detected.

Thus, since the threshold for determining whether or not the object's movement detected by the detecting unit 4d is significant is set based on the focus distance information and the focal length information, it is possible to change the value of the threshold according to the focus distance information and the focal length information.

By this, a criterion for determining whether or not the object's movement detected by the detecting unit 4d is significant can be varied and it is possible to set a determination criterion proper to a situation of shooting the subject.

Further, according to the imaging apparatus 300 of the third embodiment, if the focus distance based on the focus distance information is longer and the focal length based on the focal length information is shorter, the threshold is set to a smaller value.

Therefore, for example, the smaller the set threshold is, the lower the criterion for determining whether or not the object's movement detected by the detecting unit 4d is significant is.

Thus, since it is possible to lower the determination criterion in the case that the distance from the imaging apparatus 300 to the subject is long and an image of the subject is small, the object's movement can be determined as significant and the present embodiment can prevent the motion shutter from not operating even if a change in the movement is small.

Further, the present invention is not limited to the embodiments described above and various modification or design changes of the embodiments can be made without departing from the objects of the invention.

For example, according to the first embodiment, the detecting unit 4d determines that a person (a subject) identified by the identifying unit 4b moves in the case that the detection condition 1 is satisfied and one of the detection conditions 2 to 4 is satisfied. However, the conditions which should be satisfied for the determination can be changed as necessary. For example, the detecting unit 4d may determine that the person (the subject) identified by the identifying unit 4b moves in the case that one of the detection conditions 1 to 4 is satisfied or in the case that all of the detection conditions 1 to 4 are satisfied.

According to the first embodiment, the acquiring unit 4c extracts only portions of a standard skin color and colors similar to the standard skin color (similar colors) from the face area F detected by the identifying unit 4b and calculates an average value of colors of the extracted portions as an RGB value of the skin color of the face. However, the present invention is not limited to this embodiment. The standard skin color may be used as the RGB value of the skin color of the face.

Further, according to the first embodiment, in the case that the identifying unit 4b identifies that a subject is a human being but the human being is not a specific person, the start control unit 4e executes the shooting process of taking an image of the subject by the imaging unit 3 if the detecting unit 4d determines that the detection condition 1 is satisfied and one of the detection conditions 2 to 4 is satisfied. However, the present invention is not limited to this embodiment. For example, if the detecting unit 4d determines that the detection condition 1 is satisfied and one of the detection conditions 2 to 4 is satisfied, predetermined processing associated with shooting such as a zoom operation or a self-timer operation may be started.

Furthermore, according to the first embodiment, a characteristic motion of a person is mentioned as the specific information corresponding to the person previously stored. However, the present invention is not limited to this embodiment. For example, the specific information of the person may be an item (for example, a flag), a color, a shape (for example, a hand's shape (rock-paper-scissors)) unique to the person, and the like.

According to the first to third embodiments, in the case that it is determined that the imaging direction of the imaging unit 3 and the display direction of the display panel 8a are almost the same, a change in the state of a predetermined object is detected. However, the present invention is not limited to this embodiment and may be configured to set any condition for determining whether to detect a change in the state of a predetermined object. The present invention is also not limited to the self-portrait shooting and some embodiments may detect a change in the state of a different subject.

According to the first embodiment, a human being is identified as a subject. However, the present invention is not limited to this embodiment. For example, some embodiments may identify a car and detect whether or not the car passes a door which is a predetermined area. Another embodiment may identify a product flowing through a manufacturing line and detect whether or not the product passes a predetermined area on the line.

According to the second embodiment, the threshold is set to a value acquired by multiplying the reciprocal of the value of the focus distance, the value of the focal length and a predetermined coefficient. However, the method of calculating a value of the threshold is not limited to this. In some embodiments, it is sufficient to set the threshold to a smaller value if the focus distance is longer and the focal length is shorter. For example, in another embodiment, a table recording focus distances, focal lengths, and corresponding threshold values is stored in advance and the threshold is set to a value corresponding to acquired focus distance and focus length.

According to the modified example of the second embodiment, the threshold is set to a value acquired by multiplying the value of the face size of the person and a predetermined coefficient. However, the method of calculating a value of the threshold is not limited to this. In some embodiments, it is sufficient to set the threshold to a smaller value if the face size of the person is smaller. For example, in another embodiment, a table recording sizes of human faces and corresponding threshold values is stored in advance and the threshold is set to a value corresponding to an acquired face size of a person.

According to the third embodiment, the AF control performed for a location in which an object's movement is detected when the detecting unit 4d detects the object's movement (a change in the state) in the detection area T is not limited to single AF and may be continuous AF.

The configurations of the imaging apparatuses 100, 200, 200T and 300 of the first to third embodiments are merely examples, and the present invention is not limited to these configurations. For example, each of the imaging apparatuses can be a portable terminal such as a smart phone provided with an imaging function. For example, in the case of taking a self-portrait by using the portable terminal in the same way as each of the first to third embodiments, a lens unit of an imaging unit (a so-called in-camera) exposed in the same direction as a display panel of the portable terminal may be used to make a subject visually recognize a moving picture of itself imaged by the imaging unit and displayed by the display panel.

In addition, according to the first embodiment, the functions of the detecting means, the identifying means, the acquiring means and the control means are realized by driving the position determining unit, the identifying unit, the acquiring unit, and the detecting unit under the control of the central control unit 1. However, the present invention is not limited to the above and the functions may be realized by executing predetermined programs by the CPU of the central control unit 1.

In other words, a program including a detecting processing routine, an identifying processing routine, an acquiring processing routine, and a control processing routine is stored in a program memory (not shown in the drawings). The CPU of the central control unit 1 can function as a means for detecting a state in a predetermined area of a captured image according to the detecting processing routine. The CPU of the central control unit 1 can function as a means for identifying a subject from a captured image according to the identifying processing routine. According to the acquiring processing routine, the CPU of the central control unit 1 can function as a means for acquiring information relating to a predetermined subject in the case that the identifying processing routine identifies the predetermined subject outside the predetermined area. Further, the CPU of the central control unit 1 can function as a means for controlling detection of the state of the predetermined area by the detecting processing routine based on the information relating to the predetermined subject acquired by the acquiring processing routine according to the control processing routine.

In addition, a computer readable recording medium for recording the program for executing the respective processing can be a ROM, a hard disk, a non-volatile memory such as a flash memory, a portable storage medium such as a CD-ROM, or the like. A carrier wave can be used as a medium for providing program data through a predetermined communication line.

Although some embodiments of the present invention have been described above, the embodiments are for illustrative purposes only and not intended to limit the technical scope of the present invention. It will be evident that there are many other possible embodiments of the present invention and various modifications such as omission or substitution may be made without departing from the spirit of the invention. These embodiments and modifications fall within the scope and the spirit of the invention described in this specification and within the scope of the invention as defined in the appended claims and equivalents thereof.

What is claimed is:

1. A detecting apparatus comprising:
a processor that is configured to:
  detect a state satisfying a predetermined detection condition in a predetermined area within an image;
  identify a predetermined subject satisfying a predetermined identification condition different from the predetermined detection condition, the predetermined subject being included in an area of the image exclusive of the predetermined area;
  acquire information relating to the predetermined subject in the case that the predetermined subject satisfying the predetermined identification condition is identified as the predetermined subject included in the area of the image exclusive of the predetermined area; and
  control detection of the state satisfying the predetermined detection condition different from the predetermined identification condition in the predetermined area based on the acquired information relating to the predetermined subject.

2. The detecting apparatus of claim 1, wherein the processor is further configured to:
  be operable to detect a state of an object of a predetermined color in the predetermined area,
  acquire characteristic color information relating to a characteristic color of the predetermined subject as the information relating to the predetermined subject, and
  perform control to detect a state of an object of which color is within a range of colors the same as or similar to the characteristic color of the predetermined subject in the predetermined area based on the acquired characteristic color information.

3. The detecting apparatus of claim 1, wherein the predetermined subject is a person, and
wherein the processor is further configured to:
  be operable to detect a state of an object of a predetermined size in the predetermined area,
  acquire hand size information relating to a hand size estimated from a face size of the person who is the predetermined subject as the information relating to the predetermined subject, and
  perform control to detect a state of an object of which size is within a range of approximately the same size as the hand size in the predetermined area based on the acquired hand size information.

4. The detecting apparatus of claim 1, further comprising an imaging sensor configured to shoot the image of the subject,
wherein the processor is further configured to execute a process of shooting the image by the imaging sensor with detection of a predetermined state in the predetermined area.

5. The detecting apparatus of claim 1, wherein the processor is further configured to:
detect a change in the state in the predetermined area, and
control detection of the change in the state in the predetermined area based on the acquired information relating to the predetermined subject.

6. The detecting apparatus of claim 1, wherein the processor is further configured to:
acquire at least one kind of information from among a plurality of kinds of information relating to the predetermined subject in the case that the predetermined subject is identified as the predetermined subject included in the area of the image exclusive of the predetermined area; and
control detection of states satisfying different detection conditions based on the acquired at least one kind of information from among the plurality of kinds of information relating to the predetermined subject.

7. The detecting apparatus of claim 1, further comprising:
an imaging sensor configured to shoot the image of the subject; and
a display unit configured to display the image shot by the imaging sensor so that the identified predetermined subject can visually recognize the image,
wherein the processor is further configured to detect a state satisfying the predetermined detection condition in the predetermined area within the image shot by the imaging sensor which can be visually recognized by the predetermined subject.

8. The detecting apparatus of claim 1, wherein the processor is further configured to detect the state satisfying the predetermined detection condition in the predetermined area provided at a predetermined position within the image.

9. The detecting apparatus of claim 1, wherein the processor is further configured to:
be operable to detect a state of an object at a specific distance in the predetermined area,
acquire focus distance information relating to a focus distance of the predetermined subject as the information relating to the predetermined subject, and
perform control to detect a state of an object within a predetermined distance from the focus distance of the predetermined subject in the predetermined area within the image based on the acquired focus distance information.

10. The detecting apparatus of claim 9, wherein the predetermined subject is a person, and
wherein the processor is further configured to:
be operable to detect a state of an object of a predetermined color in the predetermined area,
acquire characteristic color information relating to a characteristic color of the person who is the predetermined subject as the information relating to the predetermined subject, and
perform control to detect a state of the object of which color is within a range of colors the same as or similar to the characteristic color of the person in the predetermined area based on the acquired characteristic color information.

11. The detecting apparatus of claim 1, wherein the processor is further configured to:
acquire focus distance information relating to a focus distance of the predetermined subject as the information relating to the predetermined subject, and
set a threshold for detecting the state in the predetermined area based on the acquired focus distance information.

12. The detecting apparatus of claim 11, wherein the processor is further configured to set the threshold based on focal length information of a lens for acquiring the image included in the detecting apparatus.

13. The detecting apparatus of claim 1, wherein the processor is further configured to:
acquire subject size information relating to a size of the predetermined subject as the information relating to the predetermined subject, and
set a threshold for detecting the state in the predetermined area based on the acquired subject size information.

14. The detecting apparatus of claim 13, wherein the predetermined subject is a person, and
wherein the processor is further configured to:
acquire face size information relating to a size of a face of the person who is the predetermined subject as the information relating to the predetermined subject, and
set the threshold for detecting the state in the predetermined area based on the acquired face size information.

15. The detecting apparatus of claim 1, wherein the processor is further configured to perform control to change a detection condition according to identified subjects.

16. The detecting apparatus of claim 15, wherein the processor is further configured to:
be operable to detect a state of an object relating to predetermined specific information in the predetermined area,
acquire specific information corresponding to a specific person previously stored in the case that the specific person is identified as the predetermined subject; and
perform control to detect a state of the object in the predetermined area based on the acquired specific information.

17. A detecting method comprising:
detecting a state satisfying a predetermined detection condition in a predetermined area within an image;
identifying a predetermined subject satisfying a predetermined identification condition different from the predetermined detection condition, the predetermined subject being included in an area of the image exclusive of the predetermined area;
acquiring information relating to the predetermined subject in the case that the predetermined subject satisfying the predetermined identification condition is identified as the predetermined subject included in the area of the image exclusive of the predetermined area; and
controlling detection of the state satisfying the predetermined detection condition different from the predetermined identification condition in the predetermined area based on the acquired information relating to the predetermined subject.

18. A detecting apparatus comprising:
a processor that is configured to:
detect a state of an object of a predetermined size in a predetermined area within an image;
identify a person from the image;
acquire hand size information relating to a hand size estimated from a face size of a predetermined person in the case that the person is identified as the predetermined person outside the predetermined area; and control detection of a state of an object which is in the predetermined area and whose size is within a range of approximately the same size as the hand size based on the acquired hand size information.

* * * * *